United States Patent
Chen et al.

(10) Patent No.: US 11,140,066 B2
(45) Date of Patent: Oct. 5, 2021

(54) METHOD FOR OBTAINING TARGET TRANSMISSION ROUTE, RELATED DEVICE, AND SYSTEM

(71) Applicant: HUAWEI TECHNOLOGIES CO., LTD., Guangdong (CN)

(72) Inventors: Qichang Chen, Shenzhen (CN); Min Zha, Shenzhen (CN); Lei Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/860,777

(22) Filed: Apr. 28, 2020

(65) Prior Publication Data

US 2020/0259734 A1   Aug. 13, 2020

Related U.S. Application Data

(63) Continuation of application No. PCT/CN2018/111811, filed on Oct. 25, 2018.

(30) Foreign Application Priority Data

Oct. 31, 2017 (CN) .......................... 201711051321.4

(51) Int. Cl.
*G06F 15/16* (2006.01)
*H04L 12/751* (2013.01)

(52) U.S. Cl.
CPC ................... *H04L 45/02* (2013.01)

(58) Field of Classification Search
USPC .......................................... 709/200; 370/254
See application file for complete search history.

(56) References Cited

U.S. PATENT DOCUMENTS

2017/0005742 A1   1/2017  Gareau et al.
2017/0005949 A1*  1/2017  Gareau ................. H04L 12/413
(Continued)

FOREIGN PATENT DOCUMENTS

CN    106803811 A    6/2017
CN    106803814 A    6/2017
(Continued)

OTHER PUBLICATIONS

Wang Q et al., "RSVP-TE Signaling Extensions in support of Flexible Ethernet networks", draft-wang-ccamp-flexe-signaling-02, Internet Engineering Task Force, Jul. 8, 2016. total 13 pages.
(Continued)

*Primary Examiner* — Anthony Mejia
(74) *Attorney, Agent, or Firm* — Womble Bond Dickinson (US) LLP

(57) ABSTRACT

Embodiments of this application provide a method for obtaining a target transmission route, a related device, and a system. The method is applied to a flexible Ethernet FlexE networking network and includes: receiving a first message that is sent by a second node for requesting to query for a transmission route of a first FlexE client; and sending a second message to the second node, where a route information entry in the second message includes route information of the FlexE client on each node. Ingress information and egress information that are of a FlexE client on a route node are recorded as a transmission route of each hop. A segment-to-segment transmission route in the FlexE network can be dynamically found in real time, a planned and deployed transmission route is compared with an actually found route, to evaluate a network running status.

20 Claims, 18 Drawing Sheets

(56) References Cited

U.S. PATENT DOCUMENTS

| | | | |
|---|---|---|---|
| 2017/0006360 A1* | 1/2017 | Gareau | G06F 13/40 |
| 2017/0093757 A1* | 3/2017 | Gareau | H04L 43/0864 |
| 2017/0171163 A1* | 6/2017 | Gareau | H04L 63/08 |
| 2018/0013511 A1* | 1/2018 | Hussain | H04J 14/0205 |
| 2018/0102834 A1* | 4/2018 | Ibach | H04B 10/03 |
| 2018/0167160 A1* | 6/2018 | Gareau | H03M 13/6522 |
| 2020/0145119 A1* | 5/2020 | Li | H04J 3/1664 |
| 2020/0195760 A1* | 6/2020 | Wang | H04L 7/027 |
| 2021/0091871 A1* | 3/2021 | Deng | H04J 3/1694 |

FOREIGN PATENT DOCUMENTS

| | | |
|---|---|---|
| CN | 107204941 A | 9/2017 |
| JP | 2010004492 A | 1/2010 |
| WO | 2017070851 A1 | 5/2017 |
| WO | 2017156987 A1 | 9/2017 |

OTHER PUBLICATIONS

R.Vilalta et al., "Network Slicing Using Dynamic Flex Ethernet over Transport Networks", 2017 European Conference on Optical Communication, IEEE. Total 3 pages.

G. Malkin:"Traceroute Using an IP Option", RFC 1393, Jan. 1993. total 7 pages.

IEEE Std 802.1ag-2007, IEEE Standard for Local and metropolitan area networks—Virtual Bridged Local Area Networks, Amendment 5: Connectivity Fault Management, total 260 pages.

Itu-T G.8013/Y.1731(Aug. 2015), Operation, administration and maintenance (OAM), functions and mechanisms for Ethernet-based networks, Aug. 2015. total 102 pages.

IEEE Std 802.11ad-2012 Part 11: Wireless LAN Medium Access Control (MAC) and Physical Layer (PHY) Specifications,Amendment 3: Enhancements for Very High Throughput in the 60 GHz Band,IEEE Computer Society, dated Oct. 19, 2012,total 628 pages.

OIF FlexE Ia 1.0, Flex Ethernet Implementation Agreement, Mar. 2016. total 31 pages.

D. Katz et al. Bidirectional Forwarding Detection (BFD) for IPv4 and IPv6 (Single Hop), RFC5881, Jun. 2010. total 7 pages.

D. Katz et al. Bidirectional Forwarding Detection (BFD) for Multihop Paths, RFC5883, Jun. 2010. total 6 pages.

IEEE Std 802.3-2015, IEEE Standard for Ethernet, IEEE Computer Society, Sponsored by the LAN/MAN Standards Committee, Approved Sep. 3, 2015, 4017 pages.

Q. Wang, Ed. Et al. RSVP-TE Signaling Extensions in support of Flexible Ethernet networks, draft-wang-ccamp-flexe-signaling-01. Mar. 21, 2016, total 12 pages. XP015112041.

\* cited by examiner

| Block# | SH | 0 | 1 | 2 | 3 | ... | 62 | 63 |
|---|---|---|---|---|---|---|---|---|
| 1 | 1 | 0 | | | | | | |
| 2 | 0 | 1 | | | | | | |
| 3 | 0 | 1 | | | | | | |
| 4 | s | s | | | | | | |
| 5 | s | s | | | | | | |
| 6 | s | s | | | Management channel (Management Channel) | | | |
| 7 | s | s | | | | | | |
| 8 | s | s | | | | | | |

FIG. 3

| Sequence number (Sequence Number) | Message type (Op Code) | Source FlexE client (Source Client) | Hop count (Hop Count) | Route information entry (Traced Route) |
|---|---|---|---|---|

FIG. 4

| Identity information of a node (Node ID) | Ingress FlexE client information (Ingress Client) | Egress FlexE client information (Egress Client) |
|---|---|---|
| ... | ... | ... |

FIG. 5

| Node 2 | FlexE group #1 + PHY #6 + FlexE client #c1 | FlexE group #3 + PHY #3 + FlexE client #c2 |

FIG. 14

| Node 2 | FlexE group #1 + PHY #1 + FlexE client #c1 | FlexE group #2 + PHY #3 + FlexE client #c2 |
| --- | --- | --- |
| Node 3 | FlexE group #1 + PHY #2 + FlexE client #c1 | FlexE group #2 + PHY #4 + FlexE client #c2 |

METHOD FOR OBTAINING TARGET
TRANSMISSION ROUTE, RELATED
DEVICE, AND SYSTEM

CROSS-REFERENCE TO RELATED
APPLICATIONS

This application is a continuation of International Application No. PCT/CN2018/111811, filed on Oct. 25, 2018, which claims priority to Chinese Patent Application No. 201711051321.4, filed on Oct. 31, 2017. The disclosures of the aforementioned applications are hereby incorporated by reference in their entireties.

TECHNICAL FIELD

This application relates to the communications field, and in particular, to a method for obtaining a target transmission route, a related device, and a system.

BACKGROUND

In a flexible Ethernet (FlexE) implementation agreement released by the optical internetworking forum (OIF), a shim layer is defined between a media access control layer and a physical layer. During FlexE-based forwarding, a transmit-end FlexE device uses a slot corresponding to a FlexE client to send a packet of the FlexE client to a receive-end FlexE device. The receive-end FlexE device obtains, in the slot corresponding to the FlexE client, data sent by the transmit-end FlexE device to restore the packet of the FlexE client.

In a process of sending the packet of the FlexE client, if a route trace packet in this transmission process can be obtained, a transmission route of the FlexE client can be clearly known.

In the prior art 1, a route tracking mechanism is set for an internet protocol (IP) packet-based network. IP routes along a route are tracked and sent hop by hop by using internet control message protocol (ICMP) format packets that are encapsulated based on IP packets. When a route detection packet is to be transmitted, an IP routing and forwarding table needs to be searched. However, in a 1.5 layer (a data transmission layer in a FlexE agreement that is located between a media access control layer and a physical layer of a 7-layer open system interconnect (OSI) reference model, and is a data transmission layer that uses a time division multiplexing (TDM) manner) network in FlexE, such a forwarding table is not used, and a specific packet in a data stream cannot be identified.

In the prior art 2, a route tracking mechanism is set for an Ethernet packet-based network that operates at a medium access control layer. A route detection packet needs to be transmitted through multicast forwarding. In addition, a specific type of Ethernet frame (which uses a specific multicast address and a specific Ethernet type) is used as a route tracing and detection packet. However, in a 1.5 layer network in FlexE, multicast is not supported, and an Ethernet frame in a data stream cannot be parsed and identified.

SUMMARY

Embodiments provide a method for obtaining a target transmission route, a related device, and a system, to provide a route discovery mechanism in a 1.5 layer network in which a FlexE interface is used.

According to a first aspect, an embodiment of this application provides a method for obtaining a target transmission route, the method is applied to a flexible Ethernet FlexE networking network, and the method includes: receiving, by a first node, a first message that is sent by a second node for requesting to query for a transmission route of a first FlexE client; and sending, by the first node, a second message to the second node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, information about a first FlexE client and information about a second FlexE client that are of a FlexE client on a route node are recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located.

In one embodiment, after the receiving, by a first node, a first message that is sent by a second node for querying for a transmission route of a first FlexE client, the method further includes: querying a slot interchange mapping table based on the first message; if it is found that a query result exists in the slot interchange mapping table, generating a third message based on the first message, and sending the third message to a third node; or if it is found that no query result exists in the slot interchange mapping table, generating the second message based on the first message.

In one embodiment, a cross mapping table of a slot allocation table of a FlexE client on a route node may be queried, and a cross mapping relationship is recorded as a transmission route of a hop. When a query result exists in the cross mapping table, the query result is recorded, the third message is generated, and the third message is sent to a next-hop node. If no query result exists in the cross mapping table, it indicates that a route is terminated on the node. The second message is returned to a last-hop node, and the second message records route information of a node at each hop. The route information in the second message can be extracted, to obtain a target transmission route.

In one embodiment, the first FlexE client includes identification information, and the querying a slot interchange mapping table based on the first message includes: determining, based on the identification information included in the first FlexE client, the information about the first slot that carries the first FlexE client; determining, based on the information about the first slot, the information about the first FlexE group that carries the first FlexE client; and querying the slot interchange mapping table based on the information about the first slot and the information about the first FlexE group.

In one embodiment, the information about the first slot that carries the first FlexE client may be determined based on the identification information included in the first FlexE client, to further determine the information about the first FlexE group that carries the first FlexE client. The information about the second FlexE client obtained after slot cross connection is obtained by using the information about the first slot and the information about the first FlexE group as query conditions.

In one embodiment, the querying a slot interchange mapping table based on the first message includes: querying the slot interchange mapping table based on the information about the first FlexE client recorded in the first message.

In one embodiment, the slot interchange mapping table may be queried based on the information about the first slot that carries the first FlexE client and the information about the first FlexE group that carries the first FlexE client, to obtain a query result, to further obtain a transmission route of the FlexE client on the node.

In one embodiment, the query result includes the information about the second slot that carries the second FlexE client and the information about the second FlexE group that carries the second FlexE client, and the generating a third message based on the first message, and sending the third message to a third node includes: generating the third message based on the first message, and sending the third message to the third node on the physical interface that carries the second FlexE client.

In one embodiment, the third message may be generated based on the first message, and then, based on the query result, the third message is sent to the third node on the physical interface that carries the second FlexE client.

In one embodiment, the third message includes a route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the route information of the FlexE client on the node may be added to the route information entry in the first message, to generate the third message, to be specific, the route information of the node is recorded into the route information entry.

In one embodiment, after the generating a third message based on the first message, and sending the third message to a third node, the method further includes: if a fourth message sent by the third node is not received within specified duration, generating the second message based on the first message, where the fourth message includes a route information entry, and the route information entry includes at least route information of the third node.

In one embodiment, when a timeout event occurs, to be specific, when the route is terminated on the node, the second message may be returned to the second node, and the second node may read the route information entry in the second message, to obtain the transmission route.

In one embodiment, the second message includes the route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the route information of the node may be added when the second message is returned, to be specific, the route information of the first node is added to the route information entry in the first message, to generate the second message.

In one embodiment, the generating the second message based on the first message includes: generating the second message based on a route information entry in the first message, where the second message includes the route information entry, and the route information entry includes the route information entry in the first message.

In one embodiment, if it is found that no query result exists in the slot interchange mapping table, it indicates that the transmission route is terminated on the node. The route information entry in the first message is directly used as the route information entry in the second message, and after the second message is returned to the second node, the second node may read the route information entry in the second message, to obtain the transmission route.

In one embodiment, after the receiving, by a first node, a first message that is sent by a second node for querying for a transmission route of a first FlexE client, and before the sending, by the first node, a second message to the second node, the method further includes:

receiving a fourth message sent by a third node, where the fourth message includes a route information entry, and the route information entry includes at least route information of the third node; and generating the second message based on the fourth message.

In one embodiment, the second message may be generated based on the fourth message returned by the third node, and after the second message is returned to the second node, the second node may read the route information entry in the second message, to obtain the transmission route.

In one embodiment, the second message includes the route information entry, and the route information entry includes the route information entry in the fourth message.

In one embodiment, in a process in which the second node sends the first message to the first node, the route information of the node is added to the route information entry. Therefore, in a process of returning the second message, the route information entry in the fourth message may be directly used as the route information entry in the second message.

In one embodiment, the second message includes the route information entry, the route information entry includes the route information entry in the fourth message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, in a process in which the first node returns the second message to the second node, the route information of the node is added to the route information entry. Therefore, the route information of the node is added to the route information entry in the fourth message, and is used as the route information entry in the second message.

In one embodiment, the first message, the second message, the third message, and the fourth message are all carried in at least one FlexE overhead frame.

In one embodiment, a FlexE overhead frame may carry the messages, to implement out-of-band communication without occupying bandwidth of a data channel, so that bearer efficiency of the data channel is not affected.

According to a second aspect, an embodiment of this application provides a method for obtaining a target transmission route, the method is applied to a flexible Ethernet FlexE networking network, and the method includes: sending, by a second node to a first node, a first message for requesting to query for a transmission route of a first FlexE client; and receiving, by the second node, a second message sent by the first node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, ingress information and egress information that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located.

In one embodiment, the first message and the second message are both carried in at least one FlexE overhead frame.

In one embodiment, a FlexE overhead frame may carry the messages during transmission, to implement out-of-band communication without occupying bandwidth of a data channel, so that bearer efficiency of the data channel is not affected.

According to a third aspect, an embodiment of this application provides a first node, the first node is applied to a flexible Ethernet FlexE networking network, and the first node includes: a first receiving unit, configured to receive a first message that is sent by a second node for requesting to query for a transmission route of a first FlexE client; and a first sending unit, configured to send a second message to the second node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, the first node further includes a query unit, configured to query a slot interchange mapping table based on the first message after the first receiving unit receives the first message that is sent by the second node for querying for the transmission route of the first FlexE client; a first generation unit, configured to: if the query unit finds that a query result exists in the slot interchange mapping table, generate a third message based on the first message, and send the third message to a third node; and a second generation unit, configured to: if the query unit finds that no query result exists in the slot interchange mapping table, generate the second message based on the first message.

In one embodiment, the first FlexE client includes identification information; and the query unit includes a first determining subunit, configured to determine, based on the identification information included in the first FlexE client, the information about the first slot for transmitting the first FlexE client, a second determining subunit, configured to determine, based on the information about the first slot, the information about the first FlexE group that carries the first FlexE client, and a query subunit, configured to query the slot interchange mapping table based on the information about the first slot and the information about the first FlexE group.

In one embodiment, the query unit is configured to query the slot interchange mapping table based on the information about the first FlexE client recorded in the first message.

In one embodiment, the query result includes the information about the second slot that carries the second FlexE client and the information about the second FlexE group that carries the second FlexE client; and the first generation unit is configured to generate the third message based on the first message, and send the third message to the third node on the physical interface that carries the second FlexE client.

In one embodiment, the third message includes a route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the first node further includes a third generation unit, configured to: after the first generation unit generates the third message based on the first message and sends the third message to the third node, generate the second message based on the first message if a fourth message sent by the third node is not received within specified duration, where the fourth message includes a route information entry, and the route information entry includes at least route information of the third node.

In one embodiment, the second message includes the route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the second generation unit is configured to generate the second message based on a route information entry in the first message, where the second message includes the route information entry, and the route information entry includes the route information entry in the first message.

In one embodiment, the first node further includes a second receiving unit, configured to: after the first receiving unit receives the first message that is sent by the second node for querying for the transmission route of the first FlexE client, and before the first sending unit sends the second message to the second node, receive a fourth message sent by a third node, where the fourth message includes a route information entry, and the route information entry includes at least route information of the third node; and a fourth generation unit, configured to generate the second message based on the fourth message.

In one embodiment, the second message includes the route information entry, and the route information entry includes the route information entry in the fourth message.

In one embodiment, the second message includes the route information entry, the route information entry includes the route information entry in the fourth message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the first message, the second message, the third message, and the fourth message are all carried in at least one FlexE overhead frame.

According to a fourth aspect, an embodiment of this application provides a second node, the second node is applied to a flexible Ethernet FlexE networking network, and the second node includes: a second sending unit, configured to send, to a first node, a first message for requesting to query for a transmission route of a first FlexE client; and a third receiving unit, configured to receive a second message sent by the first node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, the first message and the second message are both carried in at least one FlexE overhead frame.

According to a fifth aspect, an embodiment of this application provides a first node, the first node is applied to a flexible Ethernet FlexE networking network, and the first node includes a processor, a memory, and a transceiver. The processor, the memory, and the transceiver are connected to each other. The memory is configured to store a computer program, the computer program includes a program instruction, and the processor is configured to invoke the program instruction to perform the following operations: receiving a first message that is sent by a second node for requesting to query for a transmission route of a first FlexE client; and sending a second message to the second node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, after the receiving a first message that is sent by a second node for querying for a transmission route of a first FlexE client, the processor is further configured to: query a slot interchange mapping table based on the first message; if it is found that a query result exists in the slot interchange mapping table, generate a third message based on the first message, and send the third message to a third node; or if it is found that no query result exists in the slot interchange mapping table, generate the second message based on the first message.

In one embodiment, the first FlexE client includes identification information, and the querying, by the processor, a slot interchange mapping table based on the first message includes: determining, based on the identification information included in the first FlexE client, the information about the first slot that carries the first FlexE client; determining, based on the information about the first slot, the information about the first FlexE group that carries the first FlexE client; and querying the slot interchange mapping table based on the information about the first slot and the information about the first FlexE group.

In one embodiment, the querying, by the processor, a slot interchange mapping table based on the first message includes: querying the slot interchange mapping table based on the information about the first FlexE client recorded in the first message.

In one embodiment, the query result includes the information about the second slot that carries the second FlexE client and the information about the second FlexE group that carries the second FlexE client, and the generating, by the processor, a third message based on the first message, and sending the third message to a third node includes: generating the third message based on the first message, and sending the third message to the third node on the physical interface that carries the second FlexE client.

In one embodiment, the third message includes a route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, after the generating a third message based on the first message, and sending the third message to a third node, the processor is further configured to: if a fourth message sent by the third node is not received within specified duration, generate the second message based on the first message, where the fourth message includes a route information entry, and the route information entry includes at least route information of the third node.

In one embodiment, the second message includes the route information entry, the route information entry includes a route information entry in the first message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the generating, by the processor, the second message based on the first message includes: generating the second message based on a route information entry in the first message, where the second message includes the route information entry, and the route information entry includes the route information entry in the first message.

In one embodiment, after the receiving a first message that is sent by a second node for querying for a transmission route of a first FlexE client, and before the sending a second message to the second node, the processor is further configured to: receive a fourth message sent by a third node, where the fourth message includes a route information entry, and the route information entry includes at least route information of the third node; and generate the second message based on the fourth message.

In one embodiment, the second message includes the route information entry, and the route information entry includes the route information entry in the fourth message.

In one embodiment, the second message includes the route information entry, the route information entry includes the route information entry in the fourth message and route information of the first node, and the route information of the first node includes the information about the first FlexE client, the identification information of the physical interface that carries the first FlexE client, the information about the second FlexE client, and the identification information of the physical interface that carries the second FlexE client.

In one embodiment, the first message, the second message, the third message, and the fourth message are all carried in at least one FlexE overhead frame.

According to a sixth aspect, an embodiment of this application provides a second node, where the second node is applied to a flexible Ethernet FlexE networking network, and the second node includes a processor, a memory, and a transceiver. The processor, the memory, and the transceiver are connected to each other. The memory is configured to store a computer program, the computer program includes a program instruction, and the processor is configured to invoke the program instruction to perform the following operations: sending, to a first node, a first message for requesting to query for a transmission route of a first FlexE client; and receiving a second message sent by the first node, where the second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In one embodiment, the first message and the second message are both carried in at least one FlexE overhead frame.

According to a seventh aspect, an embodiment of this application provides a communications system, including a first node and a second node, where the first node is the first node according to the third aspect or any optional implementation of the third aspect, and the second node is the second node according to the fourth aspect or any optional implementation of the fourth aspect.

According to an eighth aspect, an embodiment of this application provides a computer readable storage medium, where the computer readable storage medium stores a computer program, and the computer program includes a program instruction. When the program instruction is executed by a processor of a first device, the processor of the first device is enabled to perform the method according to the first aspect or any optional implementation of the first aspect. Alternatively, when the program instruction is executed by a processor of a second device, the processor of the second device is enabled to perform the method according to the second aspect or any optional implementation of the second aspect.

In one embodiment, information about a first FlexE client and information about a second FlexE client that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

BRIEF DESCRIPTION OF DRAWINGS

To describe the technical solutions in the embodiments of this application more clearly, the following briefly describes the accompanying drawings required for describing the embodiments or the prior art.

FIG. 3 is a schematic diagram of definition of a format of a FlexE overhead frame;

FIG. 4 is a schematic diagram of a format of a data field according to an embodiment of this application;

FIG. 5 is a schematic diagram of a format of a traced route field according to an embodiment of this application;

FIG. 14 is a schematic diagram of a specific traced route field according to an embodiment of this application;

DESCRIPTION OF EMBODIMENTS

The technical solutions according to embodiments of this application are clearly described in the following with reference to the accompanying drawings.

In FlexE, rate aggregation supports carrying high-rate Ethernet service data streams on a plurality of low-rate physical interfaces, and a sub-rate and channelization allow concurrently carrying a plurality of low-rate data streams on one Ethernet physical interface.

In the FlexE, slots are divided through TDM, to implement time division-based hard segmentation of transmission channel bandwidth, and implement hard allocation of link bandwidth to several services in terms of time. One service data stream may be allocated to one or more slots, thereby implementing matching of various rate services.

Figure 1:
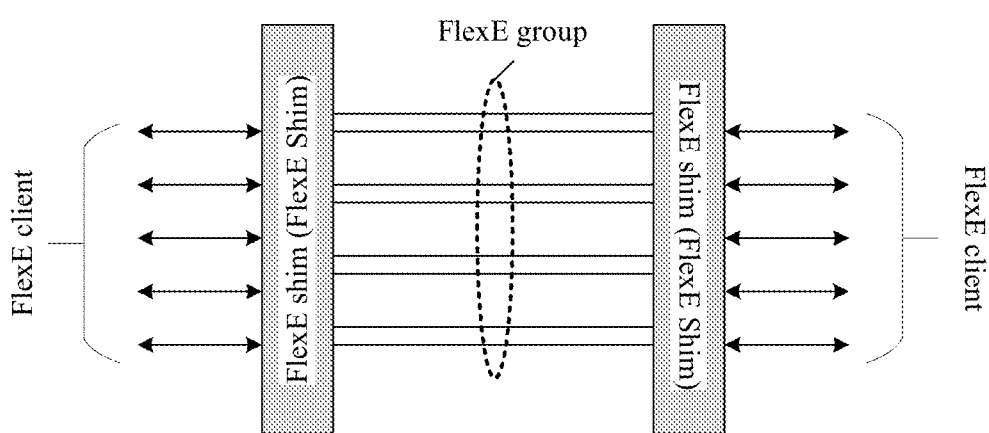
FIG. 1 is a schematic diagram of a general structure in FlexE.

One FlexE group may include one or more physical link interfaces (PHY). A slot allocation table corresponding to a FlexE group is referred to as a FlexE-calendar, and a slot mapping table corresponding to each physical interface is a referred to as a sub slot allocation table sub-calendar. Each sub-calendar indicates how 20 slots are allocated to corresponding FlexE clients. A FlexE client represents a client data stream transmitted in a specified slot (one or more slots) on a FlexE group, and a plurality of FlexE clients may be carried on one FlexE group, as shown in FIG. 1.

One FlexE client may correspond to one or more client service data streams (MAC Client). A FlexE shim layer provides data adaptation and transformation from a FlexE client to a MAC client.

Figure 2:
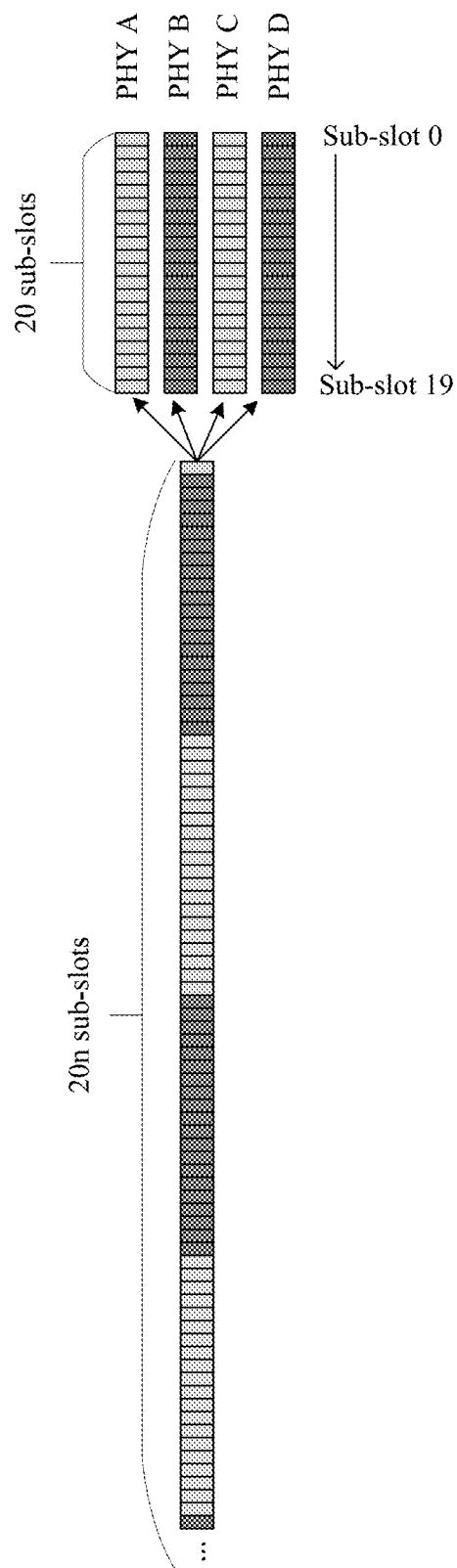
FIG. 2 is a schematic diagram of a FlexE calendar.

FIG. 2 shows a slot allocation status of a FlexE group crossing n physical interfaces (n PHYs are aggregated). Each physical interface has 20 sub-slots (Slot 0 to Slot 19). Therefore, the FlexE group has 20n sub-slots (sub-calendar).

According to a FlexE implementation agreement 1.0, an overhead block (FlexE overhead 66b block) is sent to a remote PHY on each PHY in a FlexE group at intervals of 13.1 μs, and eight FlexE overhead 66b blocks that are sequentially sent form a FlexE overhead frame. In the FlexE, some fields in the overhead frame are defined to carry a slot allocation table, and the slot table is synchronized with that of the remote PHY by using the FlexE overhead frame, to ensure that the two ends receive and send a FlexE client data stream by using a same slot allocation table. Formats of eight 66b blocks in a FlexE group overhead frame are defined as shown in FIG. 3. Blocks #1 to #3 are used to record various data. Details are not described herein. Blocks #4 to #8 are a reserved management channel (Management Channel), and record no information. Therefore, a first message, a second message, a third message, a fourth message, and the like in the embodiments of this application may be all carried in a FlexE overhead frame. The first message and the third message in the embodiments of this application may be route detection request messages. The second message and the fourth message in the embodiments of this application may be route detection response messages. Considering that one overhead frame merely provides five blocks: blocks #4 to #8 (5×64 bits=320 bits can be provided in total, that is, 40-byte space is provided for carrying messages), and storage space is limited, a plurality of consecutive FlexE overhead frames may be used to carry the messages.

The following describes a packet format of a route detection message provided in the embodiments of this application. Route detection messages include a route detection request message and a route detection response message, to be specific, the first message, the second message, the third message, the fourth message, and the like in subsequent embodiments of this application.

Specifically, in the embodiments of this application, a data field may be used to, but is not limited to being used to, record a FlexE client and route information along a route that are requested by a PE node. A specific format of the data field is shown in FIG. 4.

Specifically, a sequence number (Sequence Number) field is used to identify a number of a route detection message, and is used to distinguish different route detection messages on an entire transmission route when a user enters, on a PE node, a plurality of instructions for requesting to query for a route detection message of a FlexE client.

Specifically, a message type (Op Code) field represents a type of a route detection message, and a route detection message may be a route detection request message or a route detection response message. For example, it may be set that when a value of the Op code field is 1, it indicates that the message is a route detection request message, and when the value of the Op code field is 0, it indicates that the message is a route detection response message, and vice versa.

Specifically, a source FlexE client (Source Client) field represents a FlexE client requested by a PE node, and may be represented by a number or a slot allocation table used to transmit the FlexE client.

Specifically, a hop count (Hop Count) field indicates a current hop count of a route on which a message travels. Each time a route detection request message passes through one node, the hop count is progressively increased, and each time a route detection response message passes through one node, the hop count is progressively decreased.

Specifically, a route information entry (Traced Route) records route information detected by a route detection request message, and may be further split into and represented by a plurality of entries in the embodiments of this application, and each entry corresponds to a node of a hop on a route. As shown in FIG. 5, each entry should include identity information node ID of a current node, ingress FlexE client information ingress client, and egress FlexE client information egress client. It can be learned that the ingress FlexE client information may include information about a first FlexE client and identification information of a physical interface that carries the first FlexE client, and the egress FlexE client information may include information about a second FlexE client and identification information of a physical interface that carries the second FlexE client. An existence form of the traced route is not limited to a route information entry and may be another form, provided that route information of each node detected by the route detection request message can be recorded.

The ingress client includes information FlexE client #c1 about a first slot that carries the first FlexE client, information FlexE group #g1 about a first FlexE group that carries the first FlexE client, and identification information PHY #p1 of a physical interface that carries the first FlexE client. The egress client includes information FlexE client #c2 about a second slot that carries the second FlexE client, information FlexE group #g2 about a second FlexE group that carries the second FlexE client, and identification information PHY #p2 of a physical interface that carries the second FlexE client. The first FlexE client is a FlexE client that requests to be queried in the first message. The second FlexE client is a FlexE client obtained after slot cross connection is performed on the first FlexE client on the node. The third message is a new route detection request message generated based on the first message after the first message passes through the node, and includes at least an increase in a hop count, and may further include an increase in route information of the node in a route information entry.

A first node and a second node in the embodiments of this application may be network device (Provider Edge, (PE)) nodes connected to a user on a network edge, and an interface between networks or between devices in a network (Network to Network Interface, (NNI)) and a user-side interface (User Network Interface, (UNI)) are configured on the device. The first node and the second node in the embodiments of this application may further be network device (Provider, (P)) nodes within a network, and only an NNI is configured on the device. Specifically, the NNI may be, for example, a FlexE interface, and the UNI may be, for example, a standard Ethernet interface.

The embodiments of this application are applicable to a multi-node network that uses a FlexE interface.

Figure 6A:
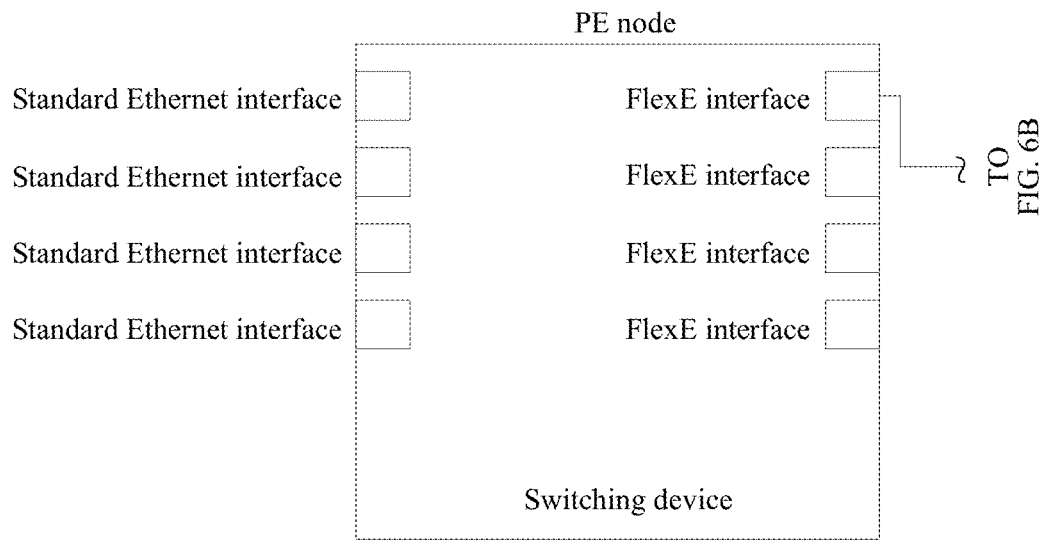
FIG. 6A to FIG. 6C are schematic structural diagrams of a communications system according to an embodiment of this application.
Figure 6B:
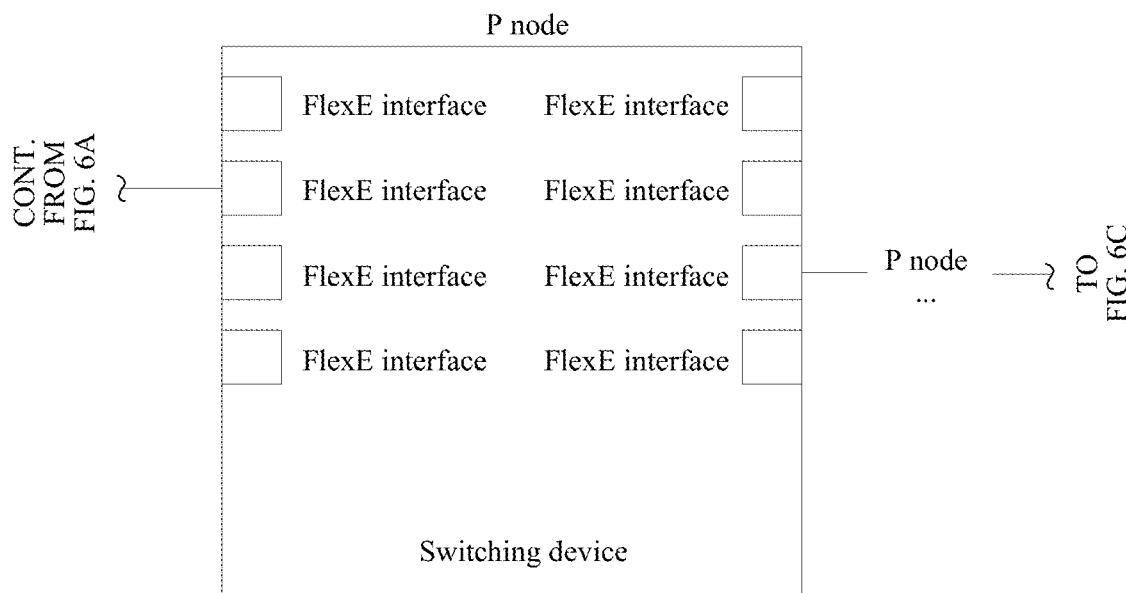
Figure 6C:
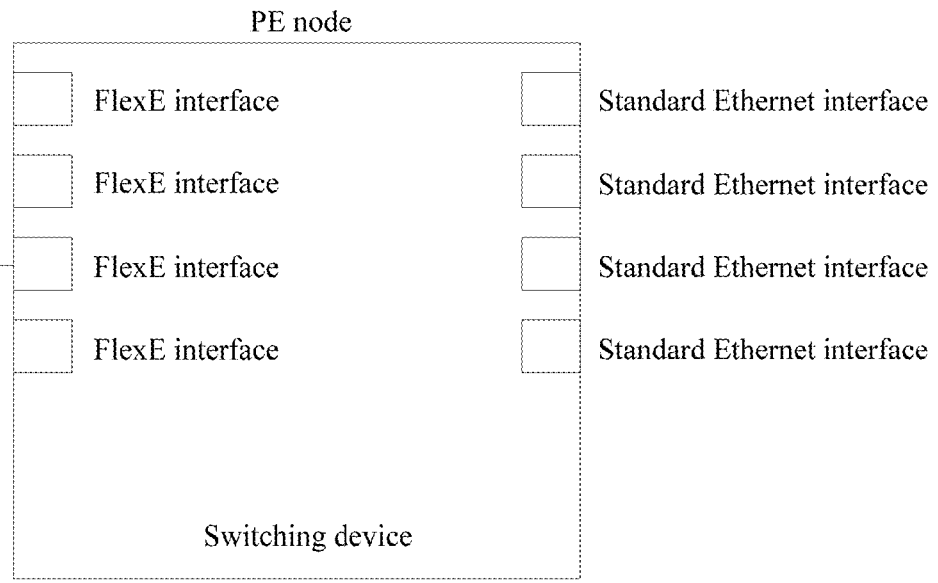
Figure 7:
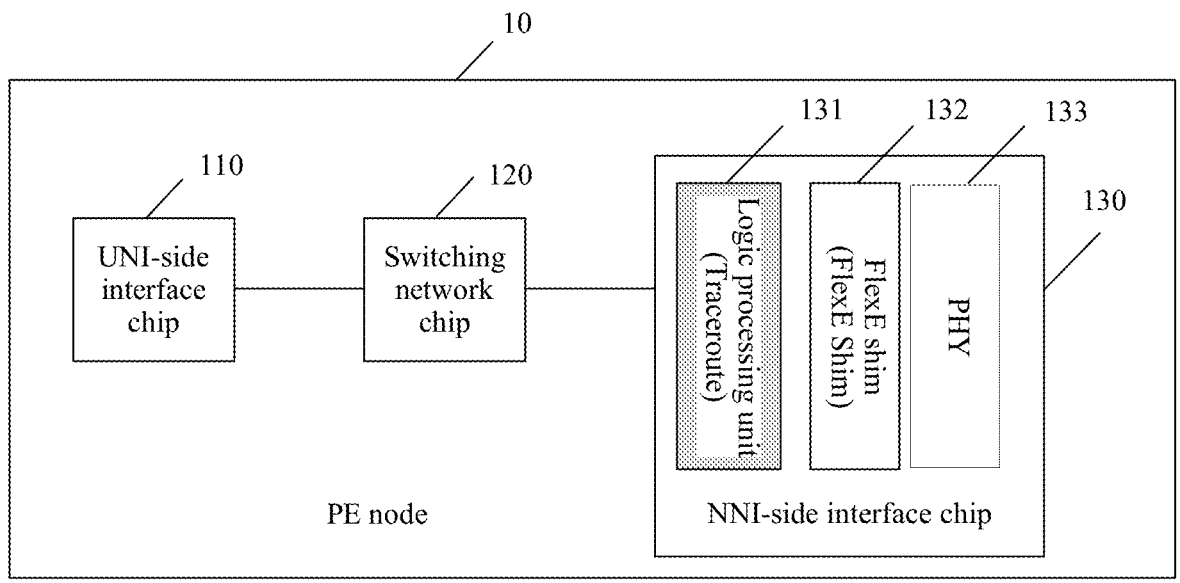
FIG. 7 is a schematic structural diagram of a PE node according to an embodiment of this application.
Figure 8:
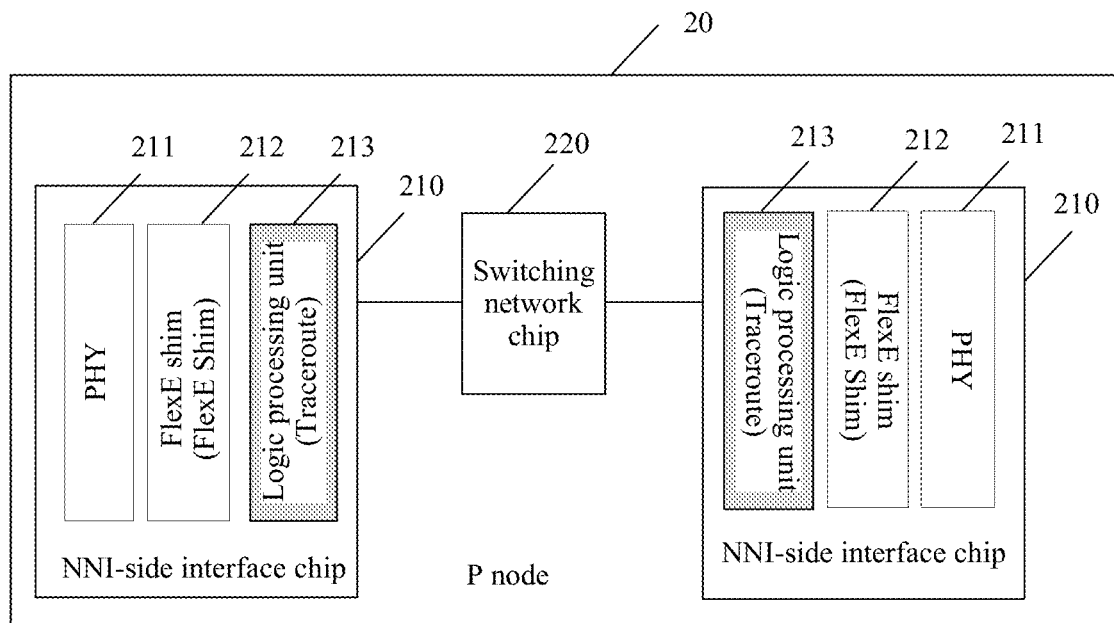
FIG. 8 is a schematic structural diagram of a P node according to an embodiment of this application.

With reference to FIG. 6A to FIG. 8, the following describes a communications system and a related device in the embodiments of this application. FIG. 6A to FIG. 6C are a schematic structural diagram of a communications system according to an embodiment of this application. FIG. 7 is a schematic structural diagram of a PE node according to an embodiment of this application. FIG. 8 is a schematic structural diagram of a P node according to an embodiment of this application.

FIG. 6A to FIG. 6C are a schematic structural diagram of a communications system according to an embodiment of this application. As shown in FIG. 6A to FIG. 6C, the communications system may include at least one PE node and several P nodes. The PE node may send, to a P node through a FlexE interface, an overhead frame that carries a route detection request message. After receiving the overhead frame that carries the route detection request message and that is sent by the PE node, the P node sends, to a next P node, a re-encapsulated overhead frame to which route information is added and that carries a route detection request message. Alternatively, the P node may send, to a previous P node or the PE node, an overhead frame that carries a route detection response message. After receiving the overhead frame that carries the route detection response message and that is sent by the P node, the PE node may extract a field that records route information in the overhead frame, to implement a route discovery function.

The PE node and the P node include but are not limited to a fixed configuration switch device, a modular configuration switch device, or the like on an IP-based transport network and an IP-based packet transport network (Packet Transport Network, PTN) that support a FlexE interface. A function unit that can implement route discovery may be added to an NNI-side interface chip of a switch device (the PE node and the P node), to be specific, a logic processing unit (traceroute) that implements route discovery is added to a FlexE interface architecture (that is, on an NNI side), to encapsulate and extract a FlexE overhead frame, and implement the route discovery function. As shown in FIG. 7 and FIG. 8, specifically, FIG. 7 is a schematic structural diagram of a PE node. It can be seen from the figure that a PE node 10 may include at least a UNI-side interface chip 110, a switching network chip 120, and an NNI-side interface chip 130. The NNI-side interface chip 130 further includes a logic processing unit (traceroute) 131, a FlexE shim (FlexE Shim) 132, and a PHY 133.

The UNI-side interface chip 110 is configured to receive various instructions entered by a user, for example, an instruction for requesting to query for a transmission route of a FlexE client. The switching network chip 120 is configured to connect the UNI-side interface chip 110 and the NNI-side interface chip 130, to implement slot interchange of a FlexE client. The logic processing unit (traceroute) 131 is configured to encapsulate and extract a FlexE overhead frame, the FlexE shim 132 is configured to transform a standard Ethernet data stream into a FlexE slot data stream, and the PHY 133 is configured to send a FlexE overhead frame to a PHY of a next node.

Specifically, FIG. 8 is a schematic structural diagram of a P node. It can be seen from the figure that a P node 20 may include at least: two NNI-side interface chips 210 and a switching network chip 220. Each NNI-side interface chip 210 further includes a PHY 211, a FlexE shim 212, and a traceroute 213.

The PHY 211 is configured to receive or send a FlexE overhead frame, the FlexE shim 212 is configured to implement mutual transformation between a standard Ethernet data stream and a FlexE slot data stream, and the traceroute 213 is configured to encapsulate and extract a FlexE overhead frame.

With reference to the descriptions of FIG. 1 to FIG. 8, the following describes a method for obtaining a target transmission route according to the embodiments of this application.

Figure 9:
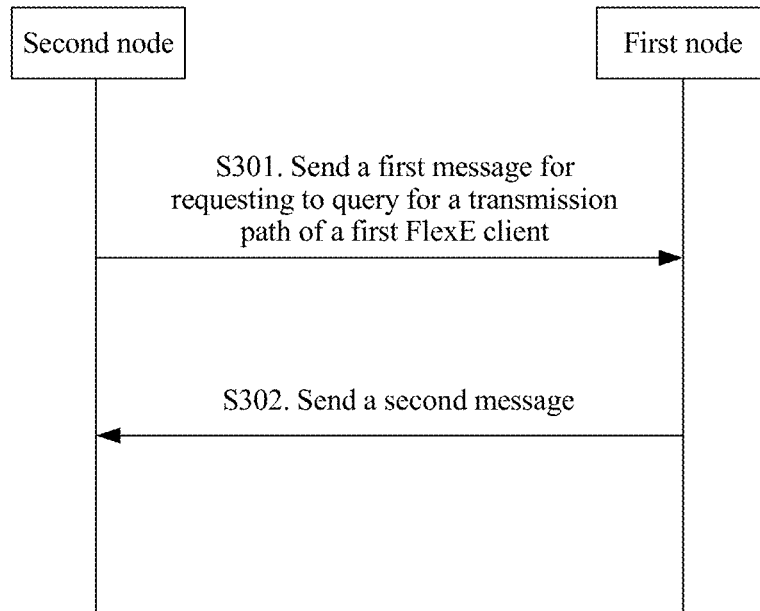
FIG. 9 is a schematic flowchart of a method for obtaining a target transmission route according to an embodiment of this application.

FIG. 9 is a schematic flowchart of a method for obtaining a target transmission route according to an embodiment of this application. The method includes but is not limited to including the following operations.

S301. A second node sends, to a first node, a first message for requesting to query for a transmission route of a first FlexE client.

In one embodiment, the second node may be a PE node, and the first node is a P node. A user may enter, on the second node, an instruction for requesting to query for the transmission route of the first FlexE client. The second node may generate the first message based on the instruction, and encapsulate the first message in at least one FlexE overhead frame. The first message may be a route detection request message.

Specifically, a first slot for transmitting the first FlexE client, a first FlexE group that carries the first slot, and a physical interface included in the first FlexE group may be queried based on the instruction. At least one physical interface for transmitting the first FlexE client is allocated, based on slots occupied by the first FlexE client, from the physical interface included in the first FlexE group.

Specifically, the first FlexE client may occupy a plurality of slots. The second node may select one physical interface from the physical interface included in the first FlexE group, or the second node may select a plurality of physical interfaces from the physical interfaces included in the first FlexE group for separately carrying one or more slots. For example, when the first FlexE client occupies two slots, one physical interface may be allocated to the first FlexE client, and the physical interface includes the two slots. Alternatively, two physical interfaces may be allocated to the first FlexE client, and the two physical interfaces each include one of the two slots.

A data field in the first message may record a label and a message type (a route detection request message) of the route detection message, a number of the first FlexE client (or a slot allocation table used for transmitting the FlexE client), a hop count, and a route information entry. It can be learned that because the second node is a PE node, the hop count is an initial value $Z_0$, for example, $Z_0$ may be but is not limited to 0, and no route information is recorded in the information entry.

In one embodiment, the second node may be a P node, and the first node is a P node. The first message sent by the second node to the first node is a route detection request message. A data field in the first message may record a label and a message type (a route detection request message) of the route detection message, a number of the first FlexE client (or a slot allocation table used for transmitting the FlexE client), a hop count, and a route information entry.

In a third possible implementation, the second node may be a P node, and the first node may be a PE node. In this case, after receiving the first message sent by the second node, the first node terminates the transmission route. A data field in the first message may record a label and a message type (a route detection request message) of the route detection message, a number of the first FlexE client (or a slot allocation table used for transmitting the FlexE client), a hop count, and a route information entry.

S302. The first node sends a second message to the second node.

Specifically, the second message includes a route information entry, and the route information entry includes at least one piece of route information. The route information includes identity information of the first node, information about the first FlexE client, first physical interface identification information, information about a second FlexE client, and second physical interface identification information. The information about the first FlexE client includes information about the first slot that carries the first FlexE client and information about the first FlexE group that carries the first FlexE client. The information about the second FlexE client includes information about a second slot that carries the second FlexE client and information about a second FlexE group that carries the second FlexE client, and the second physical interface identification information includes identification information of a physical interface that carries the second FlexE client. There is a cross relationship between the first slot that carries the first FlexE client and the second slot that carries the second FlexE client. To be specific, the first slot of the first FlexE client may cross the second slot of the second FlexE client through slot cross connection on the first node.

It can be learned that the identification information of the physical interface that carries the second slot of the second FlexE client may be identification information of all physical interfaces that carry the second slot of the second FlexE client, or may be identification information of one of a plurality of physical interfaces that carry the second slot of the second FlexE client. The first node may send a third message to a third node on the physical interface. The third message may correspond to the first message, and is obtained through updating the first message. The third message may be a route detection request message. Herein, the updating the first message may be only increasing the hop count in the first message, or may be both increasing the hop count in the first message, to generate the third message, and adding route information of the first node to the route information entry in the first message, to generate the third message.

It should be noted that the identification information of the physical interface that carries the second slot of the second FlexE client in the subsequent embodiments may be identification information of all physical interfaces that carry the second slot of the second FlexE client, or may be identification information of one of a plurality of physical interfaces that carry the second slot of the second FlexE client. Details are not described in the subsequent embodiments.

The second message may be a route detection response message, to be specific, the route detection response message returned from a downstream node after the route is terminated. The route detection response message may record route information of each node on the entire transmission route, or may record route information of all downstream nodes of the second node. It may be understood that the first node is a downstream node of the second node. In contrast, the second node is an upstream node of the first node.

In one embodiment, ingress information and egress information that are of a FlexE client on a route node may be recorded as a transmission route of each hop. A segment-to-segment transmission route in a FlexE network can be dynamically found in real time, a planned and deployed transmission route is compared with an actually found route, to evaluate a network running status, connection connectivity of the transmission route can be further detected, and a fault node on a transmission route in the FlexE network can be located.

Figure 10A:
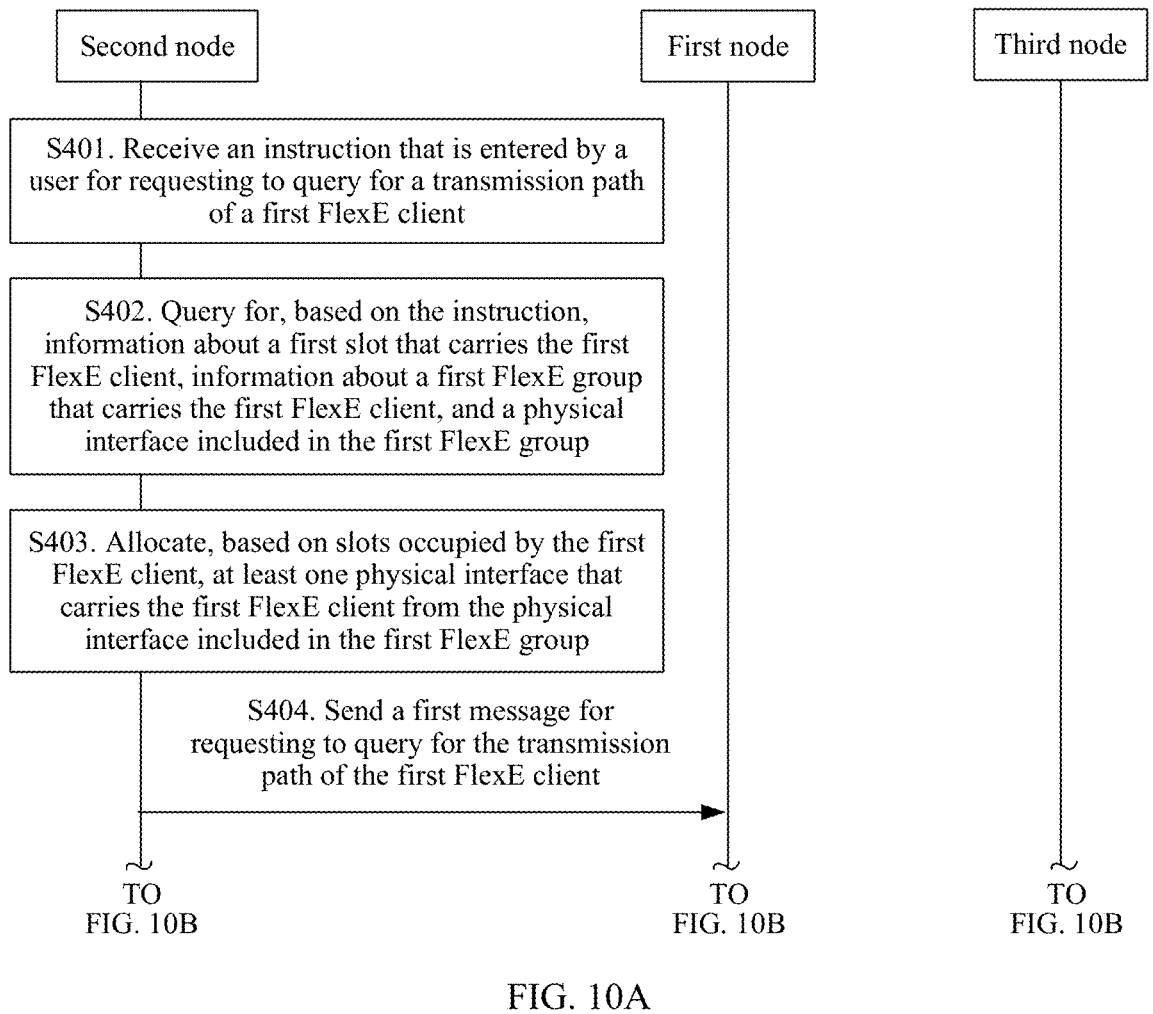
FIG. 10A and FIG. 10B are schematic flowcharts of another method for obtaining a target transmission route according to an embodiment of this application.
Figure 10B:
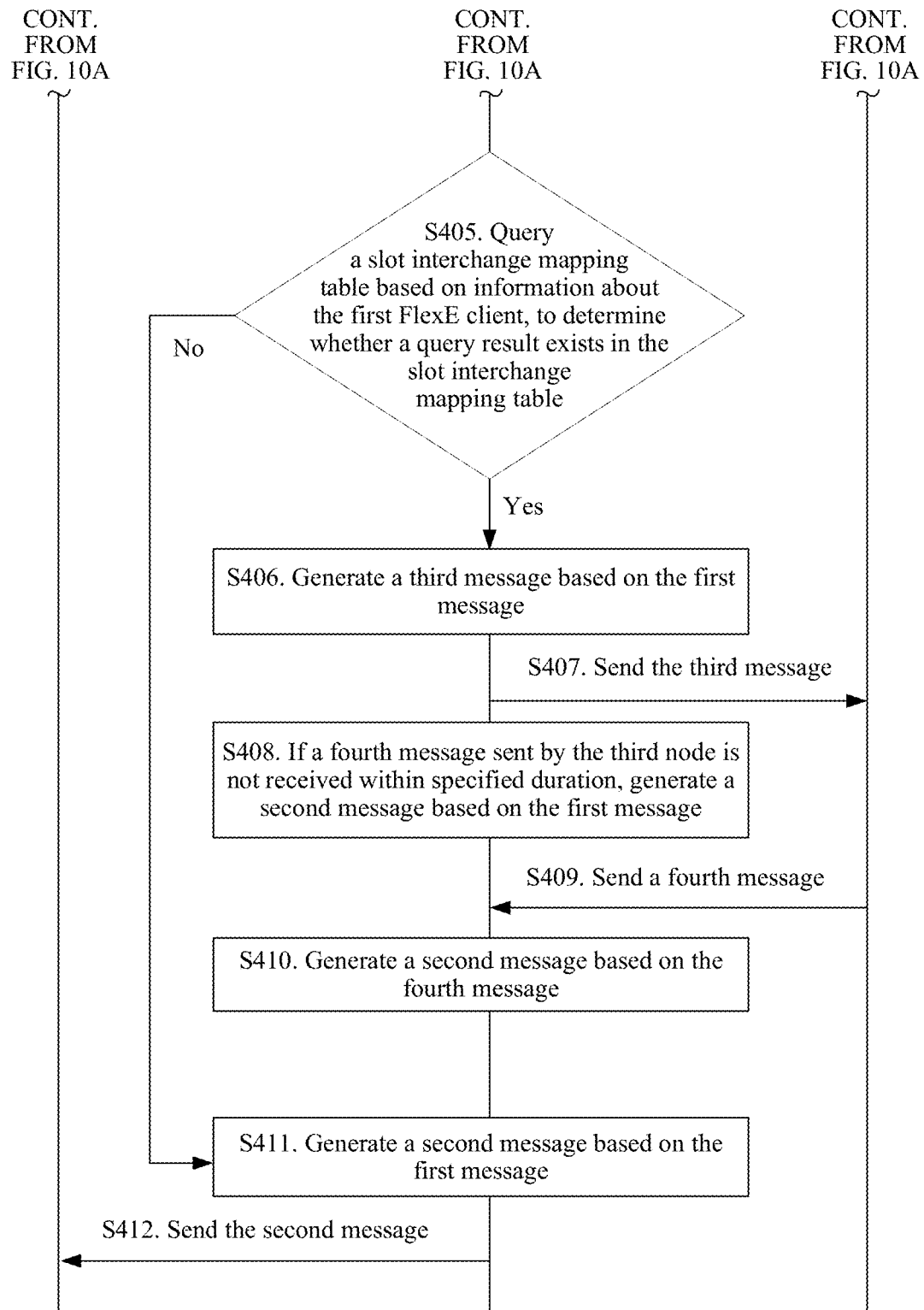

Next, FIG. 10A and FIG. 10B are a schematic flowchart of another method for obtaining a target transmission route according to an embodiment of this application. The method includes but is not limited to including the following operations.

S401. A second node receives an instruction that is entered by a user for requesting to query for a transmission route of a first FlexE client.

Specifically, the second node is a PE node. The user may enter, through a UNI-side interface of the second node, the instruction for requesting to query for the transmission route of the first FlexE client.

S402. The second node queries for, based on the instruction, information about a first slot for transmitting the first FlexE client, information about a first FlexE group that carries the first FlexE client, and a physical interface included in the first FlexE group.

Specifically, the first slot for transmitting the first FlexE client, the first FlexE group that carries the first FlexE client, and the physical interface included in the first FlexE group are all parameters that are pre-configured by the user for the node. The first FlexE group includes at least one physical interface.

In one embodiment, the first FlexE client may include identification information.

The first node may determine, based on the identification information included in the first FlexE client, the information about the first slot for transmitting the first FlexE client, to further determine the information about the first FlexE group that carries the first FlexE client.

Specifically, there is a mapping relationship between the identification information in the first FlexE client and the information about the first slot that carries the first FlexE client. The mapping relationship is also a parameter preset by the user. When the identification information in the first FlexE client is known, the information about the first slot that carries the first FlexE client may be determined according to the mapping relationship. On the contrary, identification information in a FlexE client may also be determined based on information about a slot that carries the FlexE client.

S403. The second node allocates, based on slots occupied by the first FlexE client, at least one physical interface that carries the first FlexE client from the physical interface included in the first FlexE group.

Specifically, the first FlexE client may occupy a plurality of slots. The second node may allocate one physical interface from the physical interface included in the first FlexE group, or the second node may allocate a plurality of physical interfaces from the physical interfaces included in the first FlexE group for separately carrying one or more slots. For example, when the first FlexE client occupies two slots, one physical interface may be allocated to the first FlexE client, and the physical interface includes the two slots. Alternatively, two physical interfaces may be allocated to the first FlexE client, and the two physical interfaces each include one of the two slots.

S404. The second node sends, to the first node, a first message for requesting to query for the transmission route of the first FlexE client, and the first node receives the first message sent by the second node.

Specifically, the second node generates one first message on each of the at least one allocated physical interface.

A data field in the first message may record a label and a message type (a route detection request message) of the route detection message, a number of the first FlexE client (or a slot allocation table used for transmitting the FlexE client), a hop count, and a route information entry. It can be learned that because the second node is a PE node, the hop count is an initial value $Z_0$, for example, $Z_0$ may be but is not limited to 0, and no route information is recorded in the information entry.

It can be learned that after generating one first message on each of the at least one allocated physical interface, the second node may send all the first messages to a same first node, and the first node may generate one third message for each first message. Alternatively, after generating one first message on each of the at least one allocated physical interface, the second node may separately send the first messages to different first nodes. Each first node generates one third message for each first message received by the first node.

In addition, after the second node sends the first message to the first node, a timer is started. If no second message (a route detection response message) returned by the first node is received after the timer expires, it indicates that route discovery fails, no route information is found, and a currently recorded hop count and a source client field are cleared. Timing duration of the timer may be, for example, but is not limited to, 50 n×13.1 μs, where n represents an average hop count in a FlexE network.

S405. The first node queries a slot interchange mapping table based on information about the first FlexE client, to determine whether a query result exists in the slot interchange mapping table. If the query result exists in the slot interchange mapping table, S406 is performed. If no query result exists in the slot interchange mapping table, S411 is performed.

Specifically, the information about the first FlexE client includes the information about the first slot that carries the first FlexE client and the information about the first FlexE group that carries the first FlexE client.

Specifically, the information about the first FlexE client may be obtained by extracting the source client field in the first message. In addition, when receiving the first message sent by the second node, the first node may locally store the information about the first FlexE client, and the first node may extract the information about the first FlexE client that is locally stored.

It can be learned that when the second node is a P node, the first node may extract information about a second FlexE client that is recorded in the last entry of the route information entry in the first message, and query the slot interchange mapping table by using the information about the second FlexE client as a query condition. The information about the second FlexE client is information about a slot that carries a FlexE client when the second node sends the first message to the first node, and information about a FlexE group that carries the FlexE client.

Whether the second node is a PE node or a P node may be determined by determining whether the hop count in the first message is greater than the initial value $Z_0$. If the hop count is greater than $Z_0$, it indicates that the second node is a P node, or if the hop count is $Z_0$, it indicates that the second node is a PE node.

S406. The first node generates the third message based on the first message.

Specifically, when finding, based on the information about the first FlexE client, that the query result exists in the slot interchange mapping table, the first node generates the third message based on the first message. The first message is a route detection request message, and the third message is also a route detection request message.

Specifically, the query result includes information about a second slot that carries the second FlexE client and information about a second FlexE group that carries the second FlexE client. It can be learned that the first FlexE client is interchanged into the second FlexE client through slot interchange on the first node. For each first node, a received FlexE client sent by an upstream node is the first FlexE client, and a FlexE client sent to a downstream node is the second FlexE client. In other words, a first FlexE client of a current node is a second FlexE client of an upstream node, and a second FlexE client of the current node is a first FlexE client of a downstream node.

In one embodiment, when a route detection request message is sent to a downstream node on the transmission route, route information of a current node is added to a route information entry.

Specifically, the third message includes a route information entry, and the route information entry in the third message includes the route information entry in the first message and route information of the first node. The route information of the first node includes the information about the first FlexE client, the identification information of the physical interface that carries the first FlexE client, the information about the second FlexE client, and identification information of a physical interface that carries the second FlexE client. The route information of the first node is used as the last entry of the route information entry in the third message.

In addition, the third message may further include a hop count. The hop count in the third message is increased by 1 compared with the hop count in the first message. If the hop count recorded in the first message is $Z_0$, the hop count recorded in the third message is $Z_0+1$.

In one embodiment, when a route detection request message is sent to a downstream node on the transmission route, route information of a current node is not added to a route information entry, but when a route detection response message is returned to an upstream node, the route information of the current node is added to the route information entry.

Specifically, the third message includes a route information entry, and the route information entry in the third message includes the route information entry in the first message. To be specific, the route information entry in the first message does not record any route information, and the route information entry in the third message does not record any route information, either. However, a hop count in the third message is increased by 1 compared with the hop count in the first message. If the hop count recorded in the first message is $Z_0$, the hop count recorded in the third message is $Z_0+1$.

S407. The first node sends the third message to a third node.

Specifically, the first node sends the third message to the third node on at least one physical interface that is included in the second FlexE group and that carries the second slot.

It can be learned that a specific physical interface on which the third message is sent may be preconfigured, and the physical interface may be determined based on the second slot. Alternatively, if the first node cannot determine the physical interface based on the second slot, the first node may send one third message on each physical interface included in the second FlexE group, but finally receive, on only one physical interface, a route detection response message returned by a downstream node. It can be learned that each third message records different identification information of a physical interface for sending the third message.

S408. If the first node does not receive, within specified duration, a fourth message sent by the third node, the first node generates a second message based on the first message.

Similarly, after the first node sends the third message to the third node, a timer is started. If the fourth message (a route detection response message) returned by the third node is not received after the timer expires, it indicates that the route is terminated on the third node. The second message is generated based on the first message. Timing duration of the timer may be, for example, but is not limited to, 50 n×13.1 μs, where n represents an average hop count in the FlexE network.

Specifically, the fourth message includes a route information entry, and the route information entry included in the fourth message includes at least route information of the third node. For specific content included in the route information of the third node, refer to content included in the route information of the first node. Details are not described herein again.

Specifically, the second message includes a route information entry, and the route information entry in the second message includes the route information entry in the first message and the route information of the first node. The route information of the first node includes the information about the first FlexE client, the identification information of the physical interface that carries the first FlexE client, the information about the second FlexE client, and the identification information of the physical interface that carries the second FlexE client. The route information of the first node is used as the last entry of the route information entry in the second message.

It can be learned that the second message includes the route information entry, and the route information entry in the second message includes the route information entry in the third message.

In addition, the second message may further include a hop count. The hop count in the second message is increased by 1 compared with the hop count in the first message. If the hop count recorded in the first message is $Z_0$, the hop count recorded in the third message is $Z_0+1$.

In addition, an Op code field in the second message changes. It can be learned that the first message is a route detection request message, and the second message is a route detection response message.

S409. The third node sends a fourth message to the first node, and the first node receives the fourth message sent by the third node.

Specifically, the first node receives, within specified duration, the fourth message sent by the third node. The fourth message includes a route information entry, and the route information entry includes at least route information of the third node.

In one embodiment, when a route detection request message is sent to a downstream node on the transmission route, route information of a current node is added to a route information entry. Specifically, the fourth message includes the route information entry, and the route information entry in the fourth message includes route information of all nodes on the transmission route.

In another embodiment, when a route detection request message is sent to a downstream node on the transmission route, route information of a current node is not added to a route information entry, but when a route detection response message is returned to an upstream node, the route information of the current node is added to the route information entry. Specifically, the fourth message includes the route information entry, and the route information entry in the fourth message includes route information of all downstream nodes of the first node on the transmission route, to be specific, route information of the third node and all downstream nodes of the third node.

Specifically, the third node may send the fourth message to the first node on a physical interface on which the third message is received.

S410. The first node generates a second message based on the fourth message.

In one embodiment, when a route detection request message is sent to a downstream node on the transmission route, route information of a current node is added to a route information entry. In this case, the route information entry in the fourth message includes route information of all nodes on the transmission route, and only the route information entry in the fourth message needs to be copied into a route information entry in the second message. Then, a hop count in the fourth message is subtracted by one and then is used as a hop count in the second message.

In another embodiment, when a route detection request message is sent to a downstream node on the transmission route, route information of a current node is not added to a route information entry, but when a route detection response message is returned to an upstream node, the route information of the current node is added to the route information entry. In this case, if the route information entry in the fourth message includes the route information of all the downstream nodes of the first node on the transmission route, both the route information entry in the fourth message and the route information of the first node need to be added to a route information entry in the second message. Then, a hop count in the fourth message is subtracted by one and then is used as a hop count in the second message.

In this case, the route information of the first node may be obtained in the at least two following manners.

Manner 1: The slot interchange mapping table is queried by using the information about the second FlexE client that is recorded in the last entry of the route information entry in the received fourth message as a query condition, to obtain a query result. It can be learned that the information about the second FlexE client is the information about the first FlexE client on the current first node, and the query result is the information about the second FlexE client on the current first node.

The route information of the first node includes the information about the first FlexE client, the identification information of the physical interface that carries the first FlexE client, the information about the second FlexE client, and the identification information of the physical interface that carries the second FlexE client. The route information of the first node is used as the last entry of the route information entry in the second message.

Manner 2: In a process of generating the second message based on the first message, the route information of the first node is recorded. The route information of the first node includes the information about the first FlexE client, the identification information of the physical interface that carries the first FlexE client, the information about the second FlexE client, and the identification information of the physical interface that carries the second FlexE client.

S411. The first node generates a second message based on the first message.

Specifically, when finding, based on the information about the first FlexE client, that no query result exists in the slot interchange mapping table in S405, the first node generates the second message based on the first message. The first message is a route detection request message, and the second message is a route detection response message.

Specifically, no query result exists in the slot interchange mapping table, and it indicates that the transmission route is terminated on the node, and route discovery ends. Because the second node is a PE node, when the first node finds that no query result exists in the slot interchange mapping table, it indicates that a route information entry in the second message is empty.

It can be learned that when the second node is a P node, the route information entry in the first message may include at least route information of the second node. The route information entry in the first message may be directly copied into the route information entry in the second message, and a hop count is unchanged.

S412. The first node sends the second message to the second node.

Specifically, after generating the second message based on the first message in S408, or after generating the second message based on the fourth message in S410, or after generating the second message based on the first message in S411, the first node sends the second message to the second node. The second node may extract the route information entry in the second message to obtain the transmission route.

Specifically, the first node may send the second message to the second node on a physical interface on which the first message is received.

It can be learned that, in S404, after the second node receives the instruction that is entered by the user for requesting to query for the transmission route of the first FlexE client, and generates one first message on each of the plurality of physical interfaces allocated to the slots occupied by the first FlexE client, in this case, all second messages returned based on the first messages need to be received in S412, to obtain the complete transmission route. Specifically, this may be implemented by disposing the timer on the second node. Specifically, whether the second messages correspond to a same instruction for requesting to query for the transmission route of the first FlexE client may be determined by using sequence numbers in the second messages.

It can be learned that, regardless of whether the route information of the first node is added when the third message is sent to a downstream node, or the route information of the first node is added when the second message is returned to an upstream node, the user may set a sequence for extracting transmission route information on the second node, to finally obtain a correct transmission route.

For example, the route information of the first node is added when the third message is sent to the downstream node, and finally, the route information entry in the second message is directly extracted.

For another example, the route information of the first node is added when the second message is returned to the upstream node. If node information that is locally recorded when the third message is sent is directly added, the route information entry in the second message is finally extracted in reverse order.

For another example, the route information of the first node is added when the second message is returned to the upstream node. If the slot interchange mapping table is queried according to a query condition locally stored in the first node, the route information of the first node is then added to the route information entry in the second message, and finally, the route information entry in the second message is extracted in reverse order.

For another example, the route information of the first node is added when the second message is returned to the upstream node. If the query result is obtained by querying the slot interchange mapping table based on returned information about the first FlexE client, and is used as the route information of the first node, the route information entry in the second message is finally extracted in reverse order, and then the information about the first FlexE client and the information about the second FlexE client are interchanged.

In one embodiment, information about a first FlexE client and information about a second FlexE client that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Figure 11A:
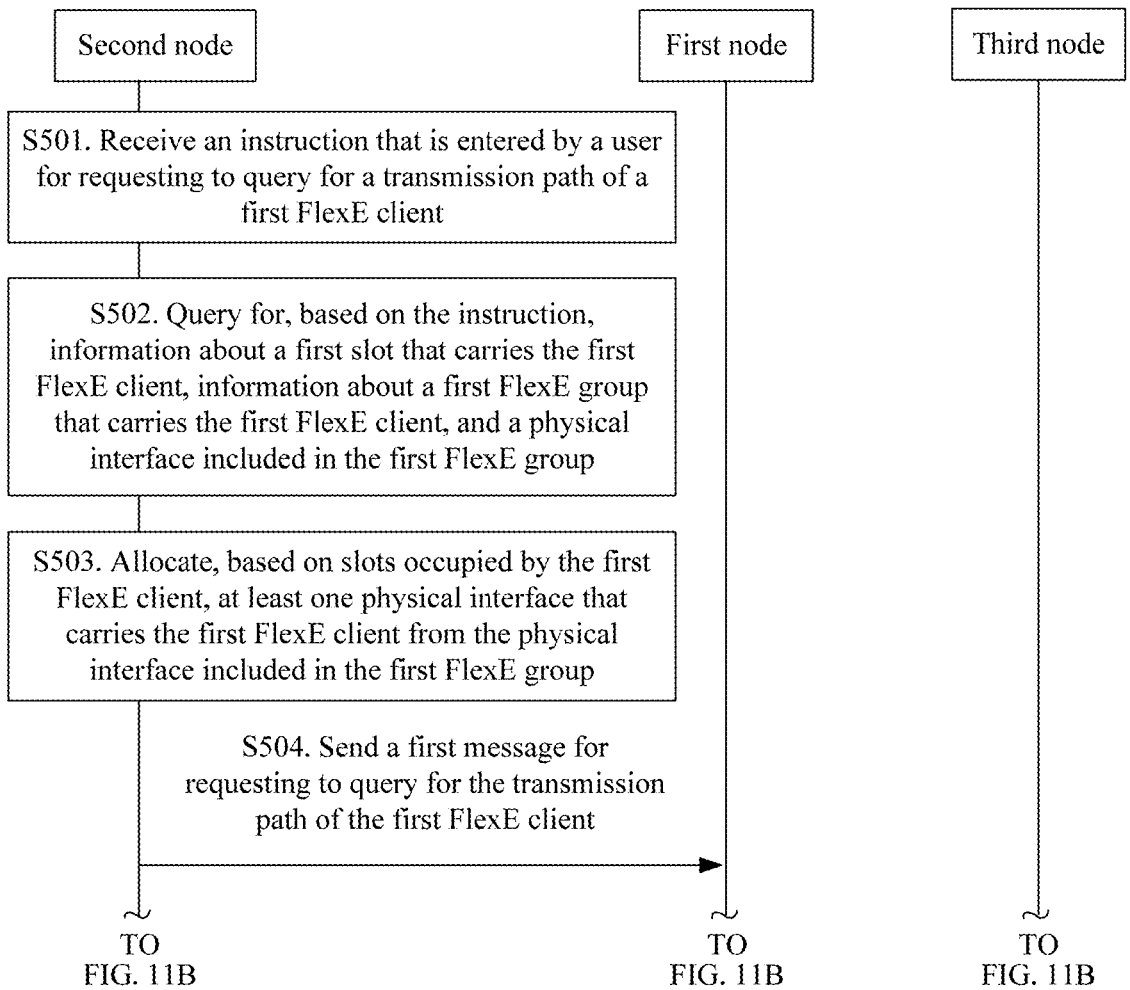
FIG. 11A and FIG. 11B are schematic flowcharts of another method for obtaining a target transmission route according to an embodiment of this application.
Figure 11B:
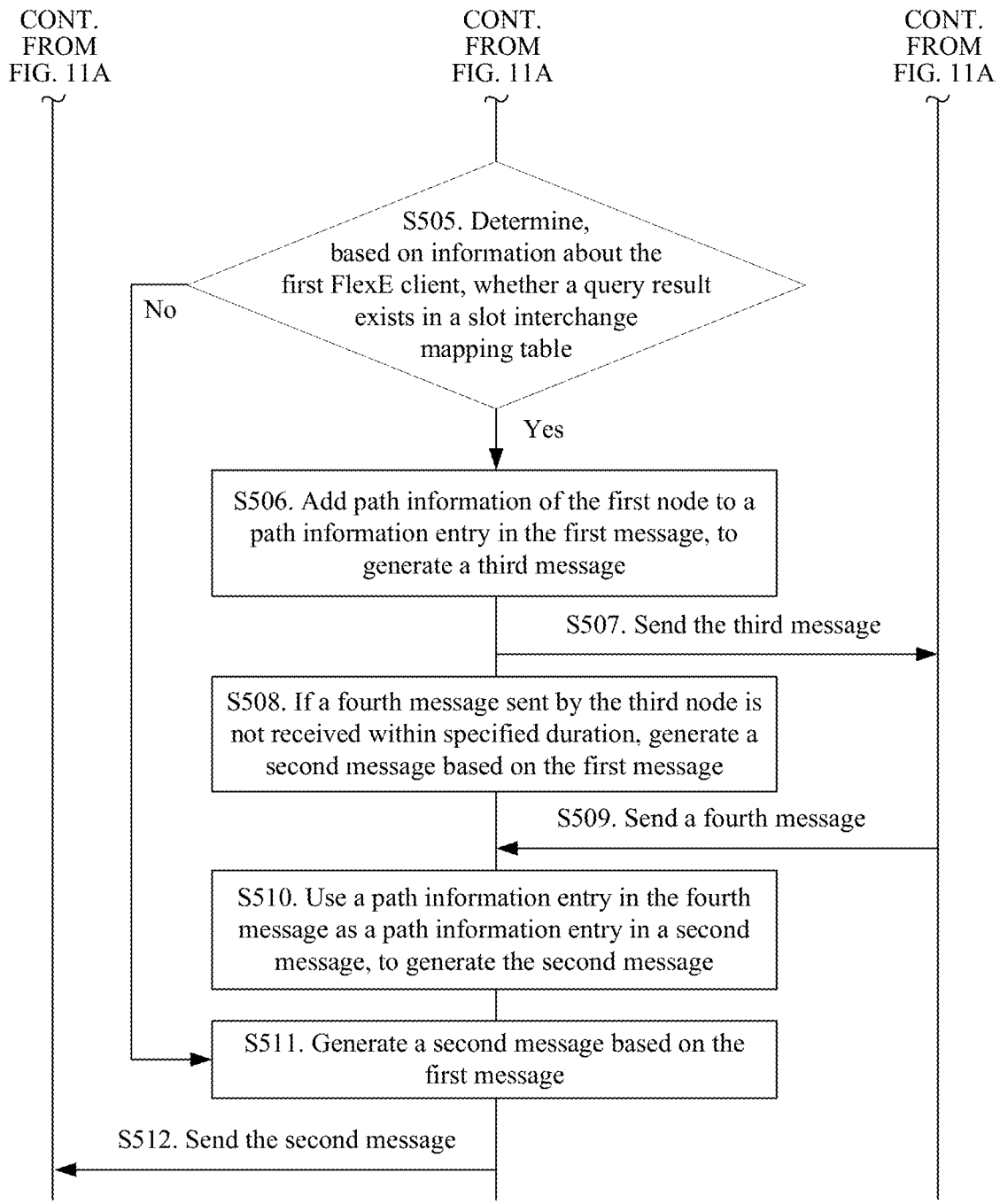
Figure 12A:
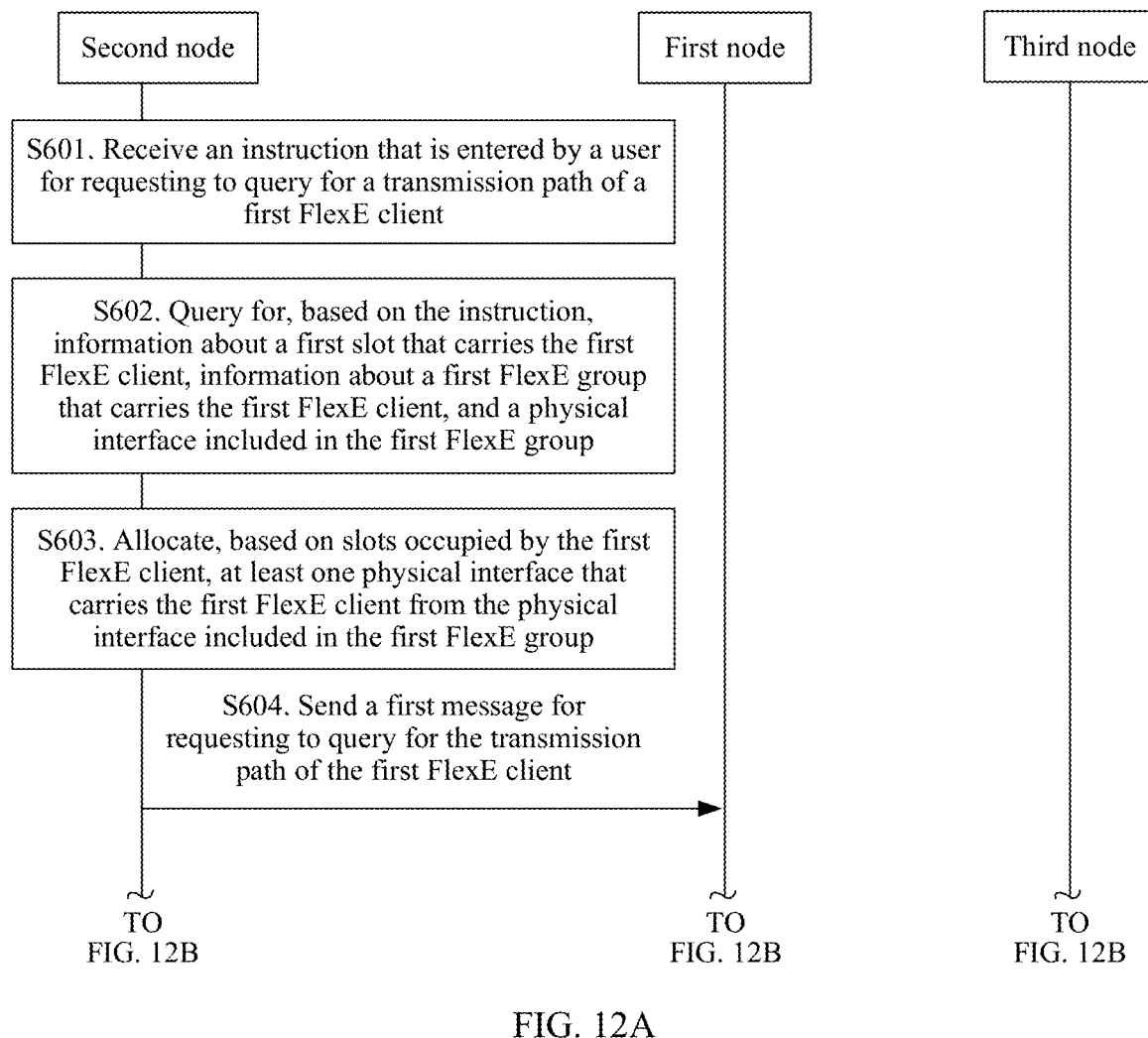
FIG. 12A and FIG. 12B are schematic flowcharts of another method for obtaining a target transmission route according to an embodiment of this application.
Figure 12B:
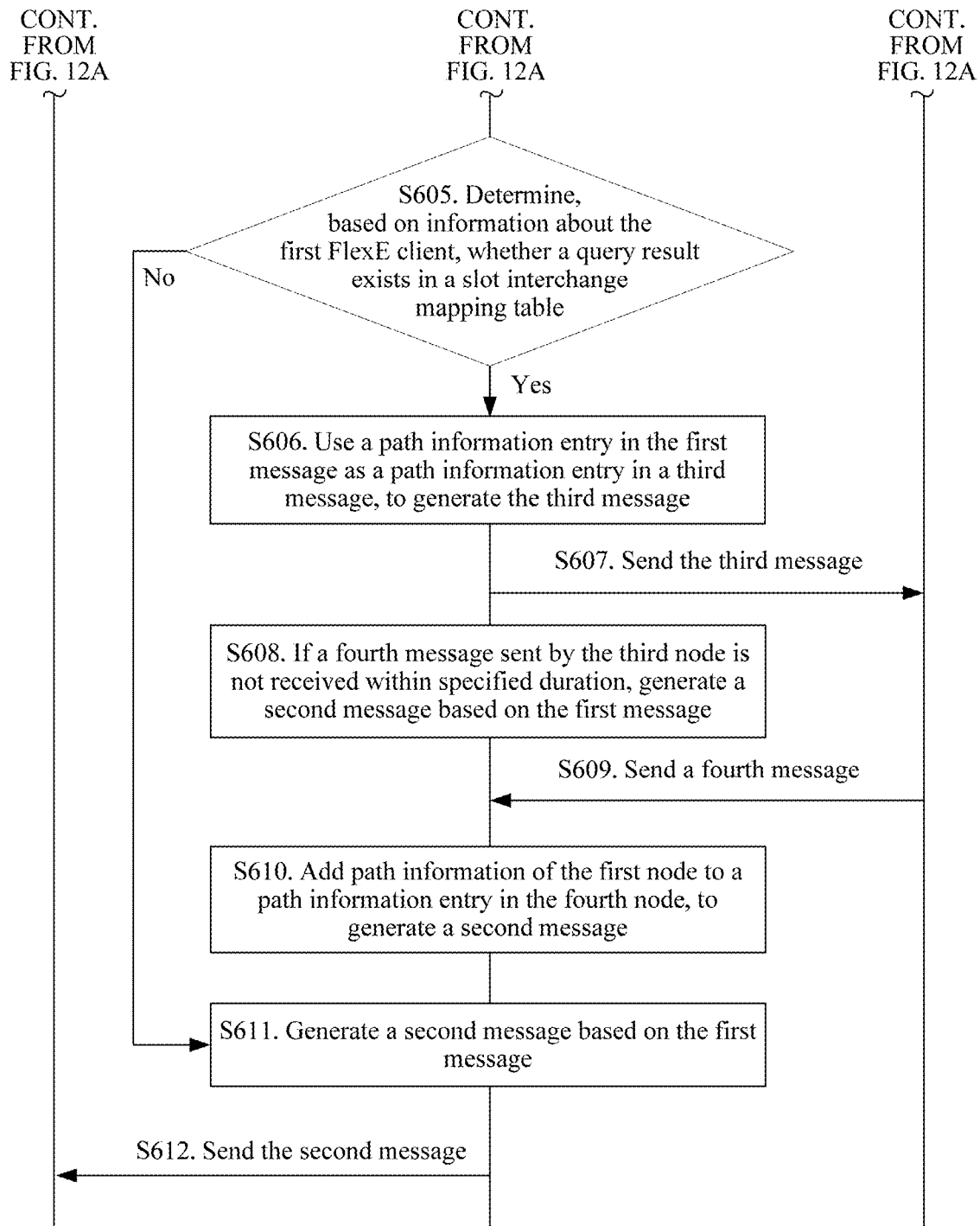

With reference to FIG. 11A and FIG. 11B and FIG. 12A and FIG. 12B, the following separately describes two different methods for obtaining a target transmission route according to an embodiment of this application. A difference between the two methods lies in different manners of adding route information of a current node to a route information entry. FIG. 11A and FIG. 11B describe adding route information of a current node to a route information entry when a route detection request message is sent to a downstream node on a transmission route. FIG. 12A and FIG. 12B describe adding route information of a current node to a route information entry when a route detection response message is returned to an upstream node on a transmission route.

As shown in FIG. 11A and FIG. 11B, a method for obtaining a target transmission route may include at least the following operations.

S501. A second node receives an instruction that is entered by a user for requesting to query for a transmission route of a first FlexE client.

S502. The second node queries for, based on the instruction, information about a first slot for transmitting the first FlexE client, information about a first FlexE group that carries the first FlexE client, and a physical interface included in the first FlexE group.

S503. The second node allocates, based on slots occupied by the first FlexE client, at least one physical interface that carries the first FlexE client from the physical interface included in the first FlexE group.

S504. The second node sends, to the first node, a first message for requesting to query for the transmission route of the first FlexE client, and the first node receives the first message sent by the second node.

S505. The first node queries a slot interchange mapping table based on information about the first FlexE client, to determine whether a query result exists in the slot interchange mapping table. If the query result exists in the slot interchange mapping table, S506 is performed. If no query result exists in the slot interchange mapping table, S511 is performed.

For implementations of S501 to S505, refer to S401 to S405 in FIG. 10A and FIG. 10B. Details are not described herein again.

S506. Add route information of the first node to a route information entry in the first message, to generate a third message.

Specifically, the query result includes information about a second slot that carries a second FlexE client and information about a second FlexE group that carries the second FlexE client. The third message includes a route information entry, and the route information entry in the third message includes the route information entry in the first message and the route information of the first node. The route information of the first node includes the information about the first FlexE client, identification information of a physical interface that carries the first FlexE client, information about the second FlexE client, and identification information of a physical interface that carries the second FlexE client. The route information of the first node is used as the last entry of the route information entry in the third message.

In addition, the third message may further include a hop count. The hop count in the third message is increased by 1 compared with a hop count in the first message. If the hop count recorded in the first message is $Z_0$, the hop count recorded in the third message is $Z_0+1$.

S507. The first node sends the third message to a third node.

S508. If the first node does not receive, within specified duration, a fourth message sent by the third node, the first node generates a second message based on the first message.

For implementations of S507 and S508, refer to S407 and S408 in FIG. 10B. Details are not described herein again.

S509. The third node sends a fourth message to the first node, and the first node receives the fourth message sent by the third node.

Specifically, the first node receives, within specified duration, the fourth message sent by the third node. The fourth message includes a route information entry, and the route information entry in the fourth message includes route information of all nodes on the transmission route.

S510. Use the route information entry in the fourth message as a route information entry in a second message, to generate the second message.

Specifically, the route information entry in the fourth message includes the route information of all the nodes on the transmission route, and only the route information entry in the fourth message needs to be copied into the route information entry in the second message. Then, a hop count in the fourth message is subtracted by one and then is used as a hop count in the second message.

S511. The first node generates a second message based on the first message.

S512. The first node sends the second message to the second node.

For implementations of S511 and S512, refer to S411 and S412 in FIG. 10B. Details are not described herein again.

In one embodiment, route information of a current node may be added to a route information entry when a route detection request message is sent to a downstream node on the transmission route. A segment-to-segment transmission route in a FlexE network can be dynamically found in real time, a planned and deployed transmission route is compared with an actually found route, to evaluate a network running status, connection connectivity of the transmission route can be further detected, and a faulty node on the transmission route in the FlexE network can be located. In addition, a FlexE overhead frame carries the messages during transmission, to implement out-of-band communication without occupying bandwidth of a data channel, so that bearer efficiency of the data channel is not affected.

As shown in FIG. 12A and FIG. 12B, a method for obtaining a target transmission route may include at least the following operations.

S601. A second node receives an instruction that is entered by a user for requesting to query for a transmission route of a first FlexE client.

S602. The second node queries for, based on the instruction, information about a first slot for transmitting the first FlexE client, information about a first FlexE group that carries the first FlexE client, and a physical interface included in the first FlexE group.

S603. The second node allocates, based on slots occupied by the first FlexE client, at least one physical interface that carries the first FlexE client from the physical interface included in the first FlexE group.

S604. The second node sends, to the first node, a first message for requesting to query for the transmission route of the first FlexE client, and the first node receives the first message sent by the second node.

S605. The first node queries a slot interchange mapping table based on information about the first FlexE client, to determine whether a query result exists in the slot interchange mapping table. If the query result exists in the slot interchange mapping table, S606 is performed. If no query result exists in the slot interchange mapping table, S611 is performed.

For implementations of S601 to S605, refer to S401 to S405 in FIG. 10A and FIG. 10B. Details are not described herein again.

S606. Use a route information entry in the first message as a route information entry in a third message, to generate the third message.

Specifically, the query result includes information about a second slot that carries a second FlexE client and information about a second FlexE group that carries the second FlexE client. The third message includes a route information entry, and the route information entry in the third message includes the route information entry in the first message. To be specific, the route information entry in the first message does not record any route information, and the route information entry in the third message does not record any route information, either. However, a hop count in the third message is increased by 1 compared with a hop count in the first message. If the hop count recorded in the first message is $Z_0$, the hop count recorded in the third message is $Z_0+1$.

S607. The first node sends the third message to a third node.

S608. If the first node does not receive, within specified duration, a fourth message sent by the third node, the first node generates a second message based on the first message.

For implementations of S607 and S608, refer to S407 and S408 in FIG. 10B. Details are not described herein again.

S609. The third node sends a fourth message to the first node, and the first node receives the fourth message sent by the third node.

Specifically, the first node receives, within specified duration, the fourth message sent by the third node. The fourth message includes a route information entry. The route information entry in the fourth message includes route information of all downstream nodes of the first node on the transmission route, to be specific, route information of the third node and all downstream nodes of the third node.

S610. Add route information of the first node to the route information entry in the fourth message, to generate a second message.

Specifically, if the route information entry in the fourth message includes the route information of all the downstream nodes of the first node on the transmission route, both the route information entry in the fourth message and the route information of the first node need to be added to a route information entry in the second message. Then, a hop count in the fourth message is subtracted by one and then is used as a hop count in the second message.

S611. The first node generates a second message based on the first message.

S612. The first node sends the second message to the second node.

For implementations of S611 and S612, refer to S411 and S412 in FIG. 10B. Details are not described herein again.

In one embodiment, route information of a current node may be added to a route information entry when a route detection response message is sent to an upstream node on the transmission route. A segment-to-segment transmission route in a FlexE network can be dynamically found in real time, a planned and deployed transmission route is compared with an actually found route, to evaluate a network running status, connection connectivity of the transmission route can be further detected, and a faulty node on the transmission route in the FlexE network can be located. In addition, a FlexE overhead frame carries the messages during transmission, to implement out-of-band communication without occupying bandwidth of a data channel, so that bearer efficiency of the data channel is not affected.

With reference to FIG. 13 to FIG. 16, the following describes three other methods for obtaining a target transmission route according to an embodiment of this application.

Figure 13:
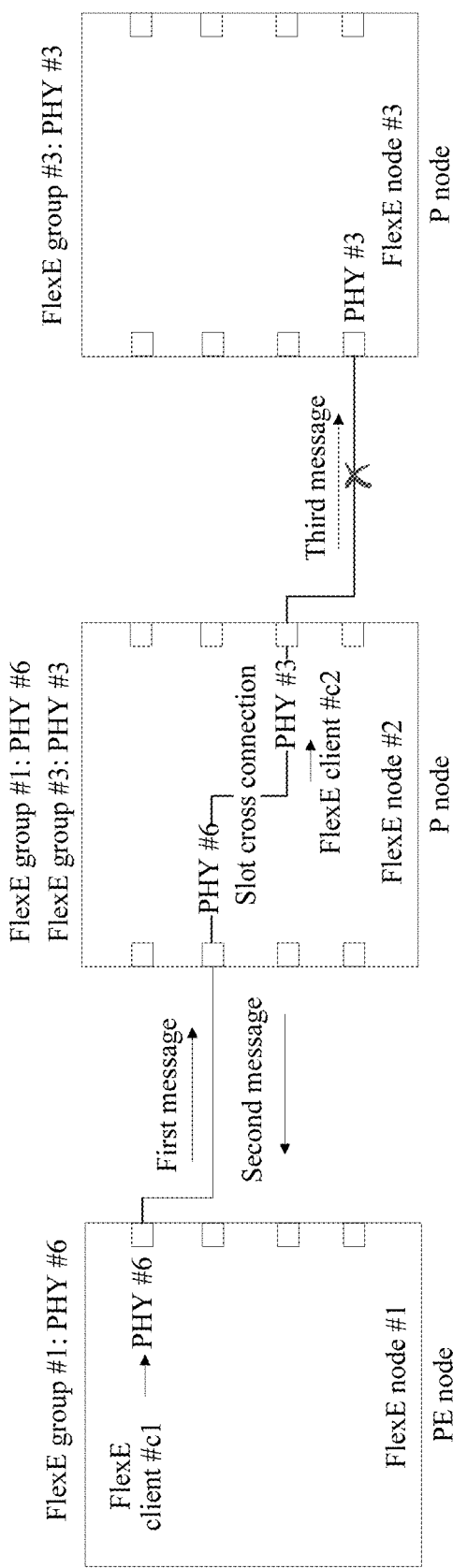
FIG. 13 is a schematic diagram of a specific scenario according to an embodiment of this application.

Manner 1: As shown in FIG. 13, a network operation and maintenance engineer or a user requests to query for a transmission route of a FlexE client #c1 (FlexE Client#c1) in a FlexE network on a PE node, namely, a FlexE node #1 (FlexE Node#1). An implementation procedure of this embodiment is as follows:

OPERATION 1: The FlexE node #1 receives a request and the entered FlexE client #c1 (c1 represents a slot allocation table, and a slot for transmitting the FlexE client may be determined based on the slot allocation table) from the user. It is found, on the FlexE node #1, that a FlexE group (FlexE Group) that carries the FlexE client #c1 is a FlexE group #1 (FlexE Group #1), and that a FlexE physical interface (PHY) included in the FlexE group #1 is a PHY #6, to be specific, a physical interface that carries the FlexE client #c1 is the PHY #6. A FlexE overhead frame that carries a first message is sent on the PHY #6. A hop count is recorded as 0, the FlexE group #1 and the FlexE client #c1 are recorded, and a timer is started.

OPERATION 2: The first message is transmitted to an NNI-side FlexE interface PHY #6 of a remote network device FlexE node #2 (FlexE Node#2). A traceroute function unit parses an Op code field in the first message as a route detection request message, reads a traced route field in the first message and finds that no route information entry is included, extracts a source client field in the first message, and queries a FlexE slot interchange mapping table in the FlexE node #2 node by using the FlexE group #1 to which the FlexE interface PHY #6 that carries the FlexE client #c1 belongs and the FlexE client #c1 slot allocation table of the source client field in the RTR message as query conditions (the query conditions are also recorded). It is found that egresses obtained through cross mapping are a FlexE group #3 (FlexE Group#3) and a FlexE client #c2 (FlexE Client#c2). A FlexE interface PHY list included in the FlexE group #3 is queried. The FlexE group #3 includes only a PHY #3, to be specific, a physical interface that carries the FlexE client #c2 is the PHY #3. A hop count in the first message is progressively increased, and Node #2 is used as a node ID. FlexE group #1+PHY #6+FlexE client #c1 (FlexE Group#1+PHY#6+FlexE Client#c1) are used as an ingress client, FlexE group #3+PHY #3+FlexE client #c2 (FlexE Group#3+PHY#3+FlexE Client#c2) are used as an egress client, and the ingress client and the egress client are attached to a traced route field as the last entry, to generate a third message. A FlexE overhead frame that carries the third message is sent on the PHY #3. A hop count is recorded as 1, the FlexE group #3 and the FlexE client #c2 are recorded, and a timer is started.

OPERATION 3: As shown in FIG. 13, because a link from the FlexE node #2 (FlexE Node#2) to a FlexE node #3 (FlexE Node#3) is faulty, the sent third message cannot reach the FlexE node #3. The FlexE node #2 receives a timeout event of the timer (a fourth message returned by the FlexE node #3 is not received after the timer expires), uses the hop count that is recorded as 1 as a hop count in a second message, uses a route information entry in the third message as a route information entry in the second message, and sends, on the physical interface PHY #6 that carries the FlexE client #c1, a FlexE overhead frame in which the second message is encapsulated. The hop count, the FlexE group #1, and the FlexE client #c1 that are currently recorded are cleared, and the timer is stopped.

OPERATION 4: The second message is transmitted to an NNI-side FlexE interface PHY #1 of the remote network device FlexE node 1. An Op code field in the message is read as a route detection response message, a hop count field in the second message is read, and it is found that a hop count is 0. The second message stops to be forwarded. The FlexE group #1 that carries the FlexE client #c1 corresponds to only one physical port PHY #1, and the second message is received through the port. Route detection terminates. The transmission route of the FlexE client #c1 on the node 1 is shown in FIG. 14.

In this embodiment of this application, a scenario in which route information of a first node is added to the route information entry in the third message when the first node sends the third message to a downstream node is used as an example to implement a route discovery procedure. Ingress information and egress information that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Manner 2: As shown in FIG. 13, a network operation and maintenance engineer or a user requests to query for a transmission route of a FlexE client #c1 in a FlexE network on a PE node, namely, a FlexE node #1. An implementation procedure of this embodiment is as follows:

OPERATION 1: The FlexE node #1 receives a request and the entered FlexE client #c1 (c1 represents a slot allocation table, and a slot for transmitting the FlexE client may be determined based on the slot allocation table) from the user. It is found, on the FlexE node #1, that a FlexE group that carries the FlexE client #c1 is a FlexE group #1, and that a FlexE physical interface (PHY) included in the FlexE group #1 is a PHY #6, to be specific, a physical interface that carries the FlexE client #c1 is the PHY #6. A FlexE overhead frame that carries a first message is sent on the PHY #6. A hop count is recorded as 0, the FlexE group #1 and the FlexE client #c1 are recorded, and a timer is started.

OPERATION 2: The first message is transmitted to an NNI-side FlexE interface PHY #6 of a remote network device FlexE node #2. A traceroute function unit parses an Op code field in the first message as a route detection request message, reads a traced route field in the first message and finds that no route information entry is included, extracts a source client field in the first message, and queries a FlexE slot interchange mapping table in the FlexE node #2 node by using the FlexE group #1 to which the FlexE interface PHY #6 that carries the FlexE client #c1 belongs and the FlexE client #c1 slot allocation table of the source client field in the RTR message as query conditions (the query conditions are also recorded). It is found that egresses obtained through cross mapping are a FlexE group #3 and a FlexE client #c2. A FlexE interface PHY list included in the FlexE group #3 is queried. The FlexE group #3 includes only a PHY #3, to be specific, a physical interface that carries the FlexE client #c2 is the PHY #3. A hop count in the first message is progressively increased, to generate a third message. A FlexE overhead frame that carries the third message is sent on the PHY #3. A hop count is recorded as 1, the FlexE group #3 and the FlexE client #c2 are recorded, and a timer is started.

OPERATION 3: As shown in FIG. 13, because a link from the FlexE node #2 to a FlexE node #3 is faulty, the sent third message cannot reach the FlexE node #3 node. The FlexE node #2 node receives a timeout event of the timer (a fourth message returned by the FlexE node #3 is not received after the timer expires), uses the hop count that is recorded as 1 as a hop count in a second message, queries a FlexE slot interchange mapping table by using the FlexE group #1 and the FlexE client #c1 and finds that egresses obtained after cross mapping is the FlexE group #3 and the FlexE client #c2 (c2 represents a slot allocation table), and queries for a PHY included in the FlexE group #1, to be specific, the FlexE group #1 corresponds only to the PHY #6. To be specific, if a physical interface that carries the FlexE client #c1 is the PHY #6, the second message is generated, and Node #2 is used as the Node ID. FlexE group #1+PHY #6+FlexE client #c1 are used as an ingress client, FlexE group #3+PHY #3+FlexE client #c2 are used as an egress client, and the ingress client and the egress client are attached to a traced route field as the last entry and are used as a route information entry in the second message. A FlexE overhead frame that carries the second message is sent on the physical interface PHY #6 that carries the FlexE client #c1. The hop count, the FlexE group #1, and the FlexE client #c1 that are currently recorded are cleared, and the RTR timer is stopped.

OPERATION 4: The second message is transmitted to an NNI-side FlexE interface PHY #1 of the remote network device FlexE node 1. An Op code field in the message is read as a route detection response message, a hop count field in the second message is read, and it is found that a hop count is 0. The second message stops to be forwarded. The FlexE group #1 that carries the FlexE client #c1 corresponds to only one physical port PHY #1, and the second message is received through the port. Route detection terminates. The transmission route of the FlexE client #c1 on the node 1 is shown in FIG. 14.

In this embodiment of this application, a scenario in which route information of a first node is added to the route information entry in the second message when the first node returns the second message to an upstream node is used as an example to implement a route discovery procedure. Ingress information and egress information that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Figure 15:
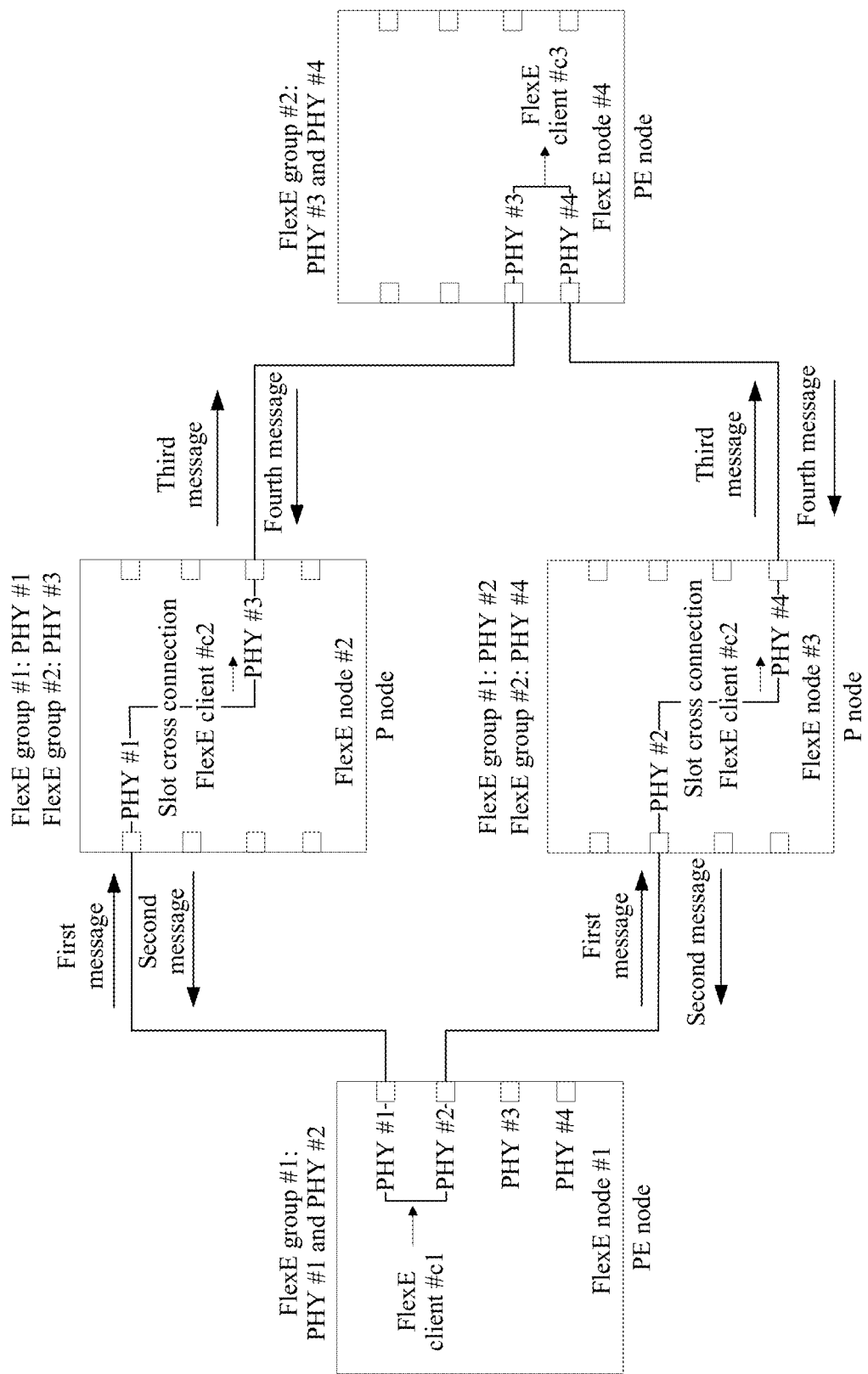
FIG. 15 is a schematic diagram of another specific scenario according to an embodiment of this application.

Manner 3: As shown in FIG. 15, a network operation and maintenance engineer or a user requests to query for a transmission route of a FlexE client #c1 (FlexE Client#c1) in a FlexE network on a PE node, namely, a FlexE node #1 (FlexE Node#1). An implementation procedure of this embodiment is as follows:

OPERATION 1: The FlexE node #1 receives a request and the entered FlexE client #c1 from the user. It is found, on the FlexE node #1, that a FlexE group that carries the FlexE client #c1 is a FlexE group #1 (FlexE Group#1), and it is found that FlexE physical interfaces (PHY) included in the FlexE group #1 are a PHY #1 and a PHY #2. A FlexE overhead frame that carries a first message is sent through each of the physical interfaces PHY #1 and PHY #2 that carry the FlexE client #c1 (the message needs to be sent by occupying several FlexE overhead sending periods). A hop count is recorded as 0, the FlexE group #1 and the FlexE client #c1 are recorded, and two timers are separately started.

OPERATION 2: The first message is transmitted to an NNI-side FlexE interface PHY #1 of a remote network device FlexE node #2 (FlexE Node#2). A traceroute function unit parses an Op code field in the first message as a route detection request message, reads a traced route field in the first message and finds that no route information entry is included, extracts a source client field in the first message, and queries a FlexE slot interchange mapping table in the FlexE node #2 node by using the FlexE group #1 to which the FlexE interface PHY #1 through which the first message is received belongs and the FlexE client #c1 slot allocation table of the source client field in the first message as query conditions (the query conditions are also recorded). It is found that egresses obtained through cross mapping are a FlexE group #2 (FlexE Group#2) and a FlexE client #c2 (FlexE Client#c2). A FlexE interface PHY list included in the FlexE group #2 is queried. The FlexE group #2 includes only a PHY #3, to be specific, a physical interface that carries the FlexE client #c2 is the PHY #3. A hop count in the first message is progressively increased, to generate a third message. A FlexE overhead frame that carries the third message is sent on the PHY #3. A hop count is recorded as 1, the FlexE group #2 and the FlexE client #c2 are recorded, and a timer is started.

OPERATION 3: The first message is transmitted to an NNI-side FlexE interface PHY #2 of a remote network device FlexE node #3 (FlexE Node#3). A traceroute function unit parses an Op code field in the first message as a route detection request message, reads a traced route field in the first message and finds that no route information entry is included, extracts a source client field in the first message, and queries a FlexE slot interchange mapping table in the FlexE node #3 node by using the FlexE group #1 to which the FlexE interface PHY #2 through which the first message is received belongs and the FlexE client #c1 slot allocation table of the source client field in the first message as query conditions (the query conditions are also recorded). It is found that egresses obtained through cross mapping are the FlexE group #2 (FlexE Group#2) and the FlexE client #c2 (FlexE Client#c2). A FlexE interface PHY list included in the FlexE group #2 is queried. The FlexE group #2 includes only a PHY #4, to be specific, a physical interface that carries the FlexE client #c2 is the PHY #4. A hop count in the first message is progressively increased, to generate a third message. A FlexE overhead frame that carries the third message is sent on the PHY #4. A hop count is recorded as 1, the FlexE group #2 and the FlexE client #c2 are recorded, and a timer is started.

OPERATION 4: A FlexE node #4 (FlexE Node#4) is a PE node, and terminates the FlexE client on the FlexE group #2. Therefore, a fourth message is constructed. A hop count (which is 1 in this case) in the third message is used as a hop count in the fourth message, and a traced route table is initialized, but an entry is empty, to generate the fourth message. The FlexE group #2 includes the PHY #3 and the PHY #4, to be specific, physical interfaces that carry the FlexE client #c2 are the PHY #3 and the PHY #4. To be specific, a FlexE overhead frame that carries the fourth message is sent on each of the PHY #3 and the PHY #4.

OPERATION 5: The FlexE node #2 node receives the fourth message from the FlexE node #4 on the PHY #3. The FlexE slot interchange mapping table is queried by using the FlexE group #2 and the FlexE client #c2, and it is found that egresses obtain after cross mapping are the FlexE group #1 and the FlexE client #c1. The PHY included in the FlexE group #1 is queried, to be specific, the FlexE group #1 corresponds only to the PHY #1, to be specific, the physical interface that carries the FlexE client #c1 is the PHY #1, and a second message is generated. The node #2, FlexE group #1+PHY #1+FlexE client #c1 (FlexE Group#1+PHY#1+FlexE Client#c1), and FlexE group #2+PHY #3+FlexE client #c2 (FlexE Group#2+PHY#3+FlexE Client#c2) are used as values of three fields: a node ID, an ingress client, and an egress client of a traced route entry, and are attached to a traced route field as the last entry. A hop count in the fourth message is progressively decreased, to generate the second message. For the physical interface PHY #1 that carries the FlexE client #c1, a FlexE overhead frame that carries the second message is sent on the PHY #1. The hop count, the FlexE group #2, and the FlexE client #c2 that are currently recorded are cleared, and the RTR timer is stopped.

OPERATION 6: The FlexE node #3 node receives the fourth message from the FlexE node #4 on the PHY #4. The FlexE slot interchange mapping table is queried by using the FlexE group #2 and the FlexE client #c2, and it is found that egresses obtain after cross mapping are the FlexE group #1 and the FlexE client #c1. The PHY included in the FlexE group #1 is queried, to be specific, the FlexE group #1 corresponds only to the PHY #2, to be specific, the physical interface that carries the FlexE client #c1 is the PHY #2, and a second message is generated. The node #3, FlexE group #1+PHY #2+FlexE client #c1 (FlexE Group#1+PHY#1+FlexE Client#c1), and FlexE group #2+PHY #4+FlexE client #c2 (FlexE Group#2+PHY#4+FlexE Client#c2) are used as values of three fields: a node ID, an ingress client, and an egress client of a traced route entry, and are attached to a traced route field as the last entry. A hop count in the fourth message is progressively decreased, to generate the second message. For the physical interface PHY #2 that carries the FlexE client #c1, an overhead frame in which the RTRR message is encapsulated is sent on the PHY #2. The hop count, the FlexE group #2, and the FlexE client #c2 that are currently recorded are cleared, and the RTR timer is stopped.

Operation 7: The second messages in OPERATION 5 and OPERATION 6 are transmitted to the NNI-side FlexE interfaces PHY #1 and PHY #2 of the remote network device FlexE node #1. Op code fields in the messages are read as route detection response messages. Hop count fields in the two second messages are read, and it is found that hop counts are both 0. The second messages stop to be forwarded. The FlexE group #1 that carries the FlexE client #c1 corresponds to only two physical ports: the PHY #1 and the PHY#2, and the second messages are received through the two ports. Route detection terminates. The transmission route of the FlexE client #c1 on the node 1 is shown in FIG. 16.

In this embodiment of this application, a scenario in which one FlexE client is carried by a plurality of PHYs is used as an example to implement a route discovery procedure. Ingress information and egress information that are of a FlexE client on a route node may be recorded as a transmission route of each hop. A segment-to-segment transmission route in the FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

The methods in the embodiments of this application are described in detail above. For ease of better implementing the foregoing solutions in the embodiments of this application, correspondingly, related apparatuses used to cooperate in implementing the foregoing solutions are further provided below.

Figures 16, 17:
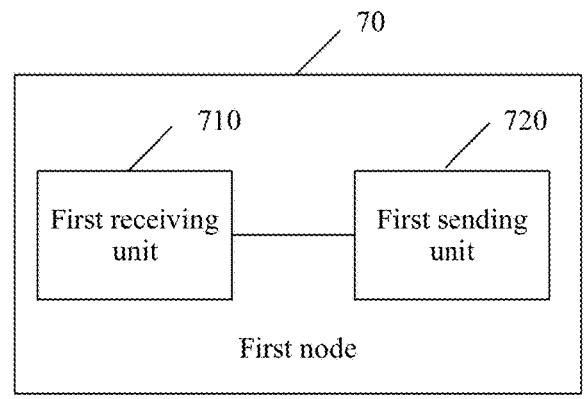
FIG. 16 is a schematic diagram of another specific traced route field according to an embodiment of this application.
FIG. 17 is a schematic structural diagram of a first node according to an embodiment of this application.

FIG. 17 is a schematic structural diagram of a first node according to an embodiment of this application. As shown in FIG. 17, the first node 70 may include at least a first receiving unit 710 and a first sending unit 720.

The first receiving unit 710 is configured to receive a first message that is sent by a second node for requesting to query for a transmission route of a first FlexE client.

The first sending unit 720 is configured to send a second message to the second node.

The second message includes a route information entry; the route information entry includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

Figure 18:
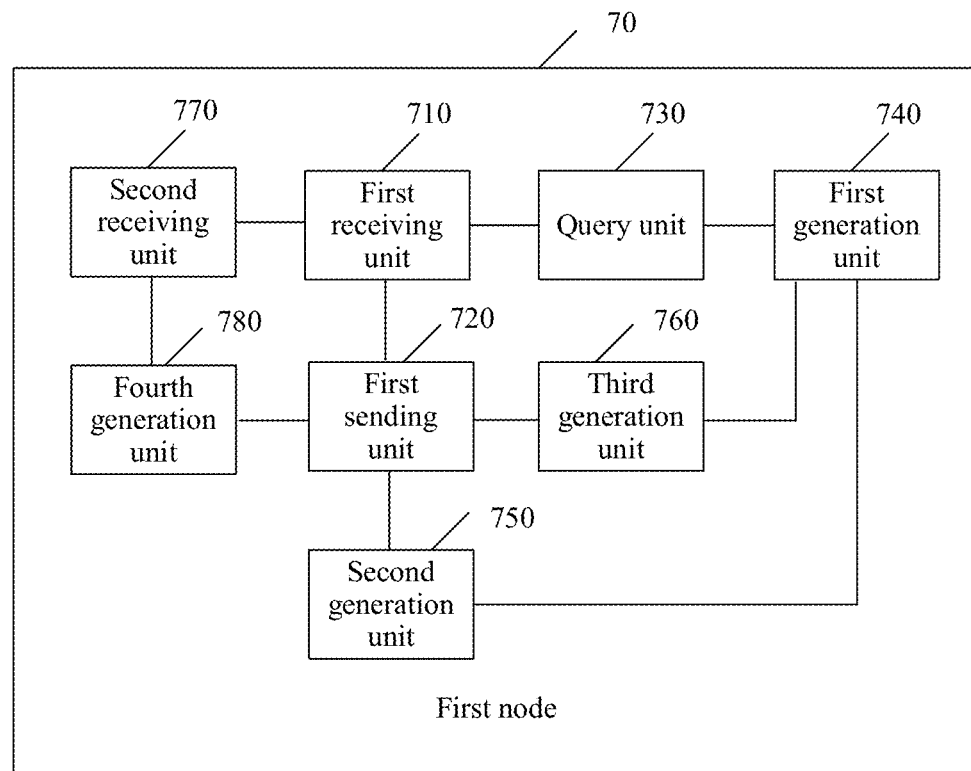
FIG. 18 is a schematic structural diagram of another first node according to an embodiment of this application.

In an optional embodiment, as shown in FIG. 18, the first node 70 further includes a query unit 730, a first generation unit 740, and a second generation unit 750.

The query unit 730 is configured to query a slot interchange mapping table based on the first message after the first receiving unit 710 receives the first message that is sent by the second node for querying for the transmission route of the first FlexE client.

The first generation unit 740 is configured to: if the query unit 730 finds that a query result exists in the slot interchange mapping table, generate a third message based on the first message, and send the third message to a third node.

The second generation unit 750, configured to: if the query unit 730 finds that no query result exists in the slot interchange mapping table, generate the second message based on the first message.

In an optional embodiment, the query unit 730 is configured to query the slot interchange mapping table based on the information about the first FlexE client recorded in the first message.

In an optional embodiment, the query result includes the information about the second slot that carries the second FlexE client and the information about the second FlexE group that carries the second FlexE client; and the first generation unit 740 is specifically configured to: generate the third message based on the first message, and send the third message to the third node on the physical interface of the second slot that carries the second FlexE client.

In an optional embodiment, the third message includes a route information entry, the route information entry in the third message includes a route information entry in the first message and route information of the first node 70, and the route information of the first node 70 includes the information about the first FlexE client, the identification information of the physical interface that carries the first FlexE client, the information about the second FlexE client, and the identification information of the physical interface that carries the second FlexE client.

In an optional embodiment, as shown in FIG. 18, the first node 70 further includes a third generation unit 760.

The third generation unit 760 is configured to: after the first generation unit 740 generates the third message based on the first message and sends the third message to the third node, generate the second message based on the first message if a fourth message sent by the third node is not received within specified duration, where the fourth message includes a route information entry, and the route information entry in the fourth message includes at least route information of the third node.

In an optional embodiment, the second message includes the route information entry, the route information entry in the second message includes a route information entry in the first message and route information of the first node 70, and the route information of the first node 70 includes the information about the first FlexE client, the identification information of the physical interface that carries the first FlexE client, the information about the second FlexE client, and the identification information of the physical interface that carries the second FlexE client.

In an optional embodiment, the second generation unit 750 is specifically configured to generate the second message based on a route information entry in the first message, where the second message includes the route information entry, and the route information entry in the second message includes the route information entry in the first message.

In an optional embodiment, as shown in FIG. 18, the first node 70 further includes a second receiving unit 770 and a fourth generation unit 780.

The second receiving unit 770 is configured to: after the first receiving unit 710 receives the first message that is sent by the second node for querying for the transmission route of the first FlexE client, and before the first sending unit 720 sends the second message to the second node, receive a fourth message sent by a third node, where the fourth message includes a route information entry, and the route information entry in the fourth message includes at least route information of the third node.

The fourth generation unit 780 is configured to generate the second message based on the fourth message.

In an optional embodiment, the second message includes the route information entry, and the route information entry in the second message includes the route information entry in the fourth message.

In an optional embodiment, the second message includes the route information entry, the route information entry in the second message includes the route information entry in the fourth message and route information of the first node 70, and the route information of the first node 70 includes the information about the first FlexE client, the identification information of the physical interface that carries the first FlexE client, the information about the second FlexE client, and the identification information of the physical interface that carries the second FlexE client.

In an optional embodiment, the first message, the second message, the third message, and the fourth message are all carried in at least one FlexE overhead frame.

It may be understood that a function of each function module of the first node 70 in this embodiment may be specifically implemented according to the method in the foregoing method embodiment, and details are not described herein again.

In one embodiment, information about a first FlexE client and information about a second FlexE client that are of a FlexE client on a route node may be recorded as a transmission route of each hop. A segment-to-segment transmission route in a FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Figure 19:
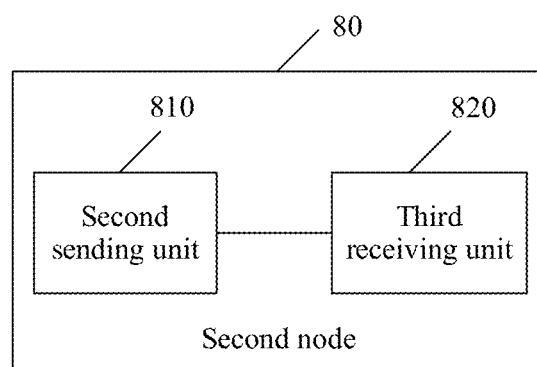
FIG. 19 is a schematic structural diagram of a second node according to an embodiment of this application.

FIG. 19 is a schematic structural diagram of a second node according to an embodiment of this application. As shown in FIG. 19, the second node 80 may include at least a second sending unit 810 and a third receiving unit 820.

The second sending unit 810 is configured to send, to the first node 70, a first message for requesting to query for a transmission route of a first FlexE client.

The third receiving unit 820 is configured to receive a second message sent by the first node 70.

The second message includes a route information entry; the route information entry in the second message includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second slot; the second physical interface identification information includes identification information of a physical interface that carries the second FlexE client; and there is a cross relationship between the first slot that carries the first FlexE client and the second slot that carries the second FlexE client.

In an optional embodiment, the first message, the second message, and the third message are all carried in at least one FlexE overhead frame.

It may be understood that a function of each function module of the second node 80 in this embodiment may be specifically implemented according to the method in the foregoing method embodiment, and details are not described herein again.

In one embodiment, information about a first FlexE client and information about a second FlexE client that are of a FlexE client on a route node may be recorded as a transmission route of each hop. A segment-to-segment transmission route in a FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Figure 20:
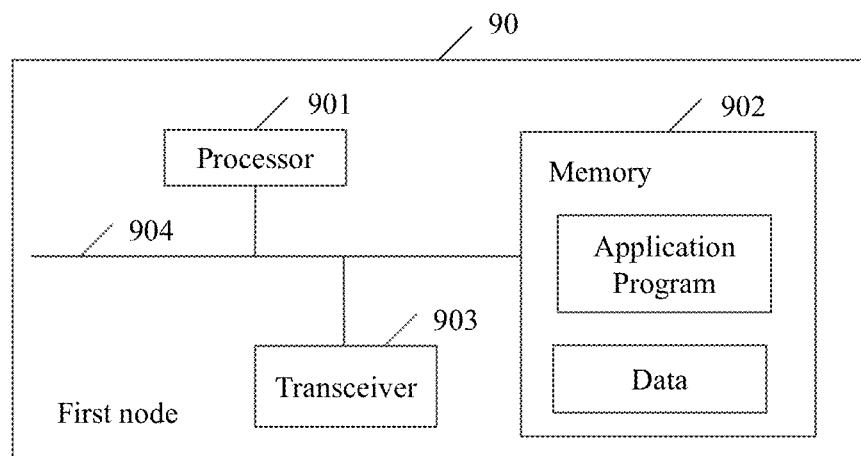
FIG. 20 is a schematic structural diagram of another first node according to an embodiment of this application.

FIG. 20 shows a first node 90 according to an embodiment of the present invention. The first node 90 includes a processor 901, a memory 902, and a transceiver 903. The processor 901, the memory 902, and the transceiver 903 are connected to each other by using a bus 904.

The memory 902 includes but is not limited to a random access memory (Random Access Memory, RAM), a read-only memory (Read-Only Memory, ROM), an erasable programmable read-only memory (Erasable Programmable Read-Only Memory, EPROM), or a flash memory. The memory 902 is configured to store a related instruction and data.

The transceiver 903 such as a radio frequency module may include a receiver and a transmitter. That the processor 901 receives or sends a message described below may be specifically understood as that the processor 901 receives or sends a message by using the transceiver.

The processor 901 may be one or more central processing units (Central Processing Unit, CPU). When the processor 901 is one CPU, the CPU may be a single-core CPU, or may be a multi-core CPU.

The processor 901 in the first node 90 is configured to read program code stored in the memory 902, to perform the following operations:

receiving, by the processor 901 by using the transceiver 903, a first message that is sent by a second node for requesting to query for a transmission route of a first FlexE client; and sending, by the processor 901, a second message to the second node by using the transceiver 903.

The second message includes a route information entry; the route information entry in the second message includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In an optional embodiment, after the first node 90 receives the first message that is sent by the second node for querying for the transmission route of the first FlexE client, the processor 901 is further configured to:

query a slot interchange mapping table based on the first message;

if it is found that a query result exists in the slot interchange mapping table, generate a third message based on the first message, and send the third message to a third node; or if it is found that no query result exists in the slot interchange mapping table, generate the second message based on the first message.

In an optional embodiment, the querying, by the processor 901, a slot interchange mapping table based on the first message includes:

querying the slot interchange mapping table based on the information about the first FlexE client recorded in the first message, where the information about the first FlexE client includes information about the first slot for transmitting the first FlexE client and the information about the first FlexE group that carries the first FlexE client.

In an optional embodiment, the query result includes the information about the second slot that carries the second FlexE client and the information about the second FlexE group that carries the second FlexE client.

The generating, by the processor 901, a third message based on the first message, and sending the third message to a third node includes:

generating the third message based on the first message, and sending the third message to the third node on the physical interface that carries the second FlexE client.

In an optional embodiment, the third message includes a route information entry, the route information entry in the third message includes a route information entry in the first message and route information of the first node 90, and the route information of the first node 90 includes the information about the first FlexE client, the identification information of the physical interface that carries the first FlexE client, the information about the second FlexE client, and the identification information of the physical interface that carries the second FlexE client.

In an optional embodiment, after the generating, by the processor 901, a third message based on the first message, and sending the third message to a third node, the processor 901 is further configured to:

generate the second message based on the first message if a fourth message sent by the third node is not received within specified duration, where the fourth message includes a route information entry, and the route information entry in the fourth message includes at least route information of the third node.

In an optional embodiment, the second message includes the route information entry, the route information entry in the second message includes a route information entry in the first message and route information of the first node 90, and the route information of the first node 90 includes the information about the first FlexE client, the identification information of the physical interface that carries the first FlexE client, the information about the second FlexE client, and the identification information of the physical interface that carries the second FlexE client.

In an optional embodiment, the generating, by the processor 901, the second message based on the first message includes:

generating the second message based on a route information entry in the first message, where the second message includes the route information entry, and the route information entry includes the route information entry in the first message.

In an optional embodiment, after the receiving, by the processor 901, a first message that is sent by a second node for querying for a transmission route of a first FlexE client, and before the ending, by the processor 901, a second message to the second node, the processor 901 is further configured to:

receive a fourth message sent by a third node, where the fourth message includes a route information entry, and the route information entry in the fourth message includes at least route information of the third node; and generate the second message based on the fourth message.

In an optional embodiment, the second message includes the route information entry, and the route information entry in the second message includes the route information entry in the fourth message.

In an optional embodiment, the second message includes the route information entry, the route information entry in the second message includes the route information entry in the fourth message and route information of the first node 90, and the route information of the first node 90 includes the information about the first FlexE client, the identification information of the physical interface that carries the first FlexE client, the information about the second FlexE client, and the identification information of the physical interface that carries the second FlexE client.

In an optional embodiment, the first message, the second message, the third message, and the fourth message are all carried in at least one FlexE overhead frame.

It should be noted that specific implementation of each operation may be further specifically implemented according to the method in the foregoing method embodiment, and details are not described herein again.

In one embodiment, information about a first FlexE client and information about a second FlexE client that are of a FlexE client on a route node may be recorded as a transmission route of each hop. A segment-to-segment transmission route in a FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Figure 21:
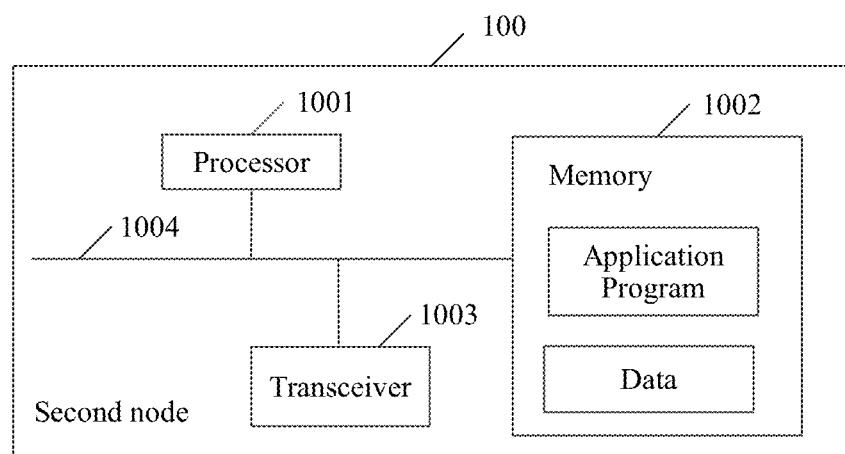
FIG. 21 is a schematic structural diagram of another second node according to an embodiment of this application.

FIG. 21 shows a second node 100 according to an embodiment of this application. The second node 100 is applied to a flexible Ethernet FlexE networking network. The second node 100 includes a processor 1001, a memory 1002, and a transceiver 1003. The processor 1001, the memory 1002, and the transceiver 1003 are connected to each other by using a bus 1004.

The memory 1002 includes but is not limited to a random access memory (Random Access Memory, RAM), a read-only memory (Read-Only Memory, ROM), an erasable programmable read-only memory (Erasable Programmable Read-Only Memory, EPROM), or a flash memory. The memory 1002 is configured to store a related instruction and data.

The transceiver 1003 such as a radio frequency module may include a receiver and a transmitter. That the processor 1001 receives or sends a message described below may be specifically understood as that the processor 1001 receives or sends a message by using the transceiver.

The processor 1001 may be one or more central processing units (Central Processing Unit, CPU). When the processor 1001 is one CPU, the CPU may be a single-core CPU, or may be a multi-core CPU.

The processor 1001 in the second node 100 is configured to read program code stored in the memory 1002, to perform the following operations:

sending, by the processor 1001 to the first node 90, a first message for requesting to query for a transmission route of a first FlexE client; and receiving, by the processor 1001, a second message sent by the first node 90.

The second message includes a route information entry; the route information entry in the second message includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

In an optional embodiment, the first message, the second message, and the third message are all carried in at least one FlexE overhead frame.

It should be noted that specific implementation of each operation may be further specifically implemented according to the method in the foregoing method embodiment, and details are not described herein again.

In one embodiment, information about a first FlexE client and information about a second FlexE client that are of a FlexE client on a route node may be recorded as a transmission route of each hop. A segment-to-segment transmission route in a FlexE network can be dynamically found in real time, a planned and deployed transmission route is compared with an actually found route, to evaluate a network running status, connection connectivity of the transmission route can be further detected, and a fault node on a transmission route in the FlexE network can be located. In addition, a FlexE overhead frame carries the messages during transmission, to implement out-of-band communication without occupying bandwidth of a data channel, so that bearer efficiency of the data channel is not affected.

Another embodiment of this application provides a computer readable storage medium. The computer readable storage medium stores a computer program. The computer program includes a program instruction. The program instruction is executed by a processor to implement the following operations: receiving, by a first node, a first message that is sent by a second node for requesting to query for a transmission route of a first FlexE client, and sending, by the first node, a second message to the second node, where the second message includes a route information entry; the route information entry in the second message includes at least one piece of route information; the route information includes identity information of the first node, information about the first FlexE client, first physical interface identification information, information about a second FlexE client, and second physical interface identification information; the information about the first FlexE client includes information about a first slot that carries the first FlexE client and information about a first FlexE group that carries the first FlexE client; the first physical interface identification information includes identification information of a physical interface that carries the first FlexE client; the information about the second FlexE client includes information about a second slot that carries the second FlexE client and information about a second FlexE group that carries the second FlexE client; the second physical interface identification information includes identification information of a physical interface that carries the second FlexE client; and there is a cross relationship between the first slot that carries the first FlexE client and the second slot that carries the second FlexE client.

The computer readable storage medium may be an internal storage unit of the first node or the second node in any one of the foregoing embodiments, for example, a hard disk or a memory of the first node or the second node. The computer readable storage medium may also be an external storage device of the first node or the second node, for example, a plug-connected hard disk, a smart media card (Smart Media Card, SMC), a secure digital (Secure Digital, SD) card, or a flash memory card (Flash Card) configured on the first node or the second node. Further, the computer readable storage medium may include both the internal storage unit and the external storage device of the first node or the second node. The computer readable storage medium is configured to store the computer program and other programs and data required by the first node or the second node. The computer readable storage medium may be further configured to temporarily store data that has been output or is to be output.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM or a random access memory RAM, a magnetic disk or an optical disc, or the like.

Although this application is described herein with reference to the embodiments, the scope of the claims of this application should not be limited. In a process of implementing this application that claims protection, a person skilled in the art may understand and implement all or some of the procedures in the foregoing embodiments by viewing the accompanying drawings, disclosed content, and the accompanying claims. Equivalent modifications made in accordance with the claims of this application shall fall within the scope of this application. In the claims, "comprising" does not exclude another component or another operation, and "a" or "one" does not exclude a case of a plurality of. A single controller or another unit may implement several functions enumerated in the claims. Some measures are recorded in dependent claims that are different from each other, but this does not mean that these measures cannot be combined to produce a better effect.

What is claimed is:

1. A method for obtaining a target transmission route, applying to a flexible Ethernet (FlexE) networking network, comprising:
   receiving, by a first node, a first message sent by a second node for requesting to query for a transmission route of a first FlexE client; and
   sending, by the first node, a second message to the second node, wherein
   the second message comprises a route information entry; wherein the route information entry comprises at least one piece of route information; wherein the route information comprises identity information of the first node, information about the first FlexE client, first physical interface identification information, information about a second FlexE client, and second physical interface identification information; wherein the information about the first FlexE client comprises information about a first slot that carries the first FlexE client and information about a first FlexE group that carries the first FlexE client; wherein the first physical interface identification information comprises identification information of a physical interface that carries the first FlexE client; wherein the information about the second FlexE client comprises information about a second slot that carries the second FlexE client and information about a second FlexE group that carries the second FlexE client; wherein the second physical interface identification information comprises identification information of a physical interface that carries the second FlexE client; and wherein there is a cross relationship between the first slot that carries the first FlexE client and the second slot that carries the second FlexE client.

2. The method according to claim 1, wherein after the receiving, by the first node, the first message sent by the second node for querying for the transmission route of the first FlexE client, the method further comprises:
   querying a slot interchange mapping table based on the first message;
   if it is found that a query result exists in the slot interchange mapping table, generating a third message based on the first message, and sending the third message to a third node; or
   if it is found that no query result exists in the slot interchange mapping table, generating the second message based on the first message.

3. The method according to claim 2, wherein the querying the slot interchange mapping table based on the first message comprises:
   querying the slot interchange mapping table based on the information about the first FlexE client recorded in the first message.

4. The method according to claim 3, wherein the query result comprises the information about the second slot that carries the second FlexE client and the information about the second FlexE group that carries the second FlexE client; and
   the generating the third message based on the first message, and sending the third message to a third node comprises:
   generating the third message based on the first message, and sending the third message to the third node on the physical interface that carries the second FlexE client.

5. The method according to claim 4, wherein the third message comprises a route information entry, wherein the route information entry comprises a route information entry in the first message and route information of the first node, and wherein the route information of the first node comprises the information about the first FlexE client, the identification information of the physical interface that carries the first FlexE client, the information about the second FlexE client, and the identification information of the physical interface that carries the second FlexE client.

6. The method according to claim 4, wherein after the generating the third message based on the first message, and sending the third message to the third node, the method further comprises:
   if a fourth message sent by the third node is not received within a specified duration, generating the second message based on the first message, wherein the fourth message comprises a route information entry, and the route information entry comprises at least route information of the third node.

7. The method according to claim 6, wherein the second message comprises the route information entry, wherein the route information entry comprises a route information entry in the first message and route information of the first node, and wherein the route information of the first node comprises the information about the first FlexE client, the identification information of the physical interface that carries the first FlexE client, the information about the second FlexE client, and the identification information of the physical interface that carries the second FlexE client.

8. The method according to claim 2, wherein the generating the second message based on the first message comprises:
   generating the second message based on a route information entry in the first message, wherein the second message comprises the route information entry, and wherein the route information entry comprises the route information entry in the first message.

9. The method according to claim 1, wherein after the receiving, by the first node, the first message sent by the second node for querying for the transmission route of the first FlexE client, and before the sending, by the first node, the second message to the second node, the method further comprises:
receiving a fourth message sent by a third node, wherein the fourth message comprises a route information entry, and wherein the route information entry comprises at least route information of the third node; and
generating the second message based on the fourth message.

10. The method according to claim 9, wherein the second message comprises the route information entry, and wherein the route information entry comprises the route information entry in the fourth message.

11. The method according to claim 9, wherein the second message comprises the route information entry, wherein the route information entry comprises the route information entry in the fourth message and route information of the first node, and wherein the route information of the first node comprises the information about the first FlexE client, the identification information of the physical interface that carries the first FlexE client, the information about the second FlexE client, and the identification information of the physical interface that carries the second FlexE client.

12. The method according to claim 6, wherein the first message, the second message, the third message, and the fourth message are all carried in at least one FlexE overhead frame.

13. A method for obtaining a target transmission route, applying to a flexible Ethernet FlexE networking network, comprising:
sending, by a second node to a first node, a first message for requesting to query for a transmission route of a first FlexE client; and
receiving, by the second node, a second message sent by the first node, wherein
the second message comprises a route information entry; wherein the route information entry comprises at least one piece of route information; wherein the route information comprises identity information of the first node, information about the first FlexE client, first physical interface identification information, information about a second FlexE client, and second physical interface identification information; wherein the information about the first FlexE client comprises information about a first slot that carries the first FlexE client and information about a first FlexE group that carries the first FlexE client; wherein the first physical interface identification information comprises identification information of a physical interface that carries the first FlexE client; wherein the information about the second FlexE client comprises information about a second slot that carries the second FlexE client and information about a second FlexE group that carries the second FlexE client; wherein the second physical interface identification information comprises identification information of a physical interface that carries the second FlexE client; and wherein there is a cross relationship between the first slot that carries the first FlexE client and the second slot that carries the second FlexE client.

14. The method according to claim 13, wherein the first message and the second message are both carried in at least one FlexE overhead frame.

15. A first node applied to a flexible Ethernet FlexE networking network, comprising:
a first receiver, configured to receive a first message sent by a second node for requesting to query for a transmission route of a first FlexE client; and
a first sender, configured to send a second message to the second node, wherein
the second message comprises a route information entry; wherein the route information entry comprises at least one piece of route information; wherein the route information comprises identity information of the first node, information about the first FlexE client, first physical interface identification information, information about a second FlexE client, and second physical interface identification information; wherein the information about the first FlexE client comprises information about a first slot that carries the first FlexE client and information about a first FlexE group that carries the first FlexE client; wherein the first physical interface identification information comprises identification information of a physical interface that carries the first FlexE client; wherein the information about the second FlexE client comprises information about a second slot that carries the second FlexE client and information about a second FlexE group that carries the second FlexE client; wherein the second physical interface identification information comprises identification information of a physical interface that carries the second FlexE client; and wherein there is a cross relationship between the first slot that carries the first FlexE client and the second slot that carries the second FlexE client.

16. The first node according to claim 15, wherein the first node further comprises:
a processor, configured to query a slot interchange mapping table based on the first message after the first receiver receives the first message sent by the second node for querying for the transmission route of the first FlexE client;
if a query result exists in the slot interchange mapping table, generate a third message based on the first message, and send the third message to a third node; or
if no query result exists in the slot interchange mapping table, generate the second message based on the first message.

17. The first node according to claim 16, wherein the processor is configured to query the slot interchange mapping table based on the information about the first FlexE client recorded in the first message.

18. The first node according to claim 17, wherein the query result comprises the information about the second slot that carries the second FlexE client and the information about the second FlexE group that carries the second FlexE client; and
Wherein the processor is further configured to: generate the third message based on the first message, and send the third message to the third node on the physical interface that carries the second FlexE client.

19. The first node according to claim 18, wherein the third message comprises a route information entry, wherein the route information entry comprises a route information entry in the first message and route information of the first node, and wherein the route information of the first node comprises the information about the first FlexE client, the identification information of the physical interface that carries the first FlexE client, the information about the second FlexE client, and the identification information of the physical interface that carries the second FlexE client.

20. The first node according to claim 18, wherein the processor is further configured to: after generating the third message based on the first message and sending the third message to the third node, generate the second message based on the first message if a fourth message sent by the third node is not received within specified duration, wherein the fourth message comprises a route information entry, and the route information entry comprises at least route information of the third node.

* * * * *